United States Patent
Orbach

(10) Patent No.: US 10,855,804 B2
(45) Date of Patent: *Dec. 1, 2020

(54) NEEDS-MATCHING NAVIGATOR SYSTEM

(71) Applicant: Tuvi Orbach, London (GB)

(72) Inventor: Tuvi Orbach, London (GB)

(73) Assignee: Tuvi Orbach, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/683,866

(22) Filed: Nov. 14, 2019

(65) Prior Publication Data

US 2020/0084290 A1 Mar. 12, 2020

Related U.S. Application Data

(63) Continuation of application No. 16/148,693, filed on Oct. 1, 2018, now Pat. No. 10,511,686, which is a
(Continued)

(51) Int. Cl.
*H04L 29/08* (2006.01)
*G06N 5/02* (2006.01)
(Continued)

(52) U.S. Cl.
CPC .......... *H04L 67/306* (2013.01); *G06N 5/02* (2013.01); *G06Q 30/00* (2013.01);
(Continued)

(58) Field of Classification Search
CPC .. G06F 19/3418; G06F 19/3425; G06Q 10/10
See application file for complete search history.

(56) References Cited

U.S. PATENT DOCUMENTS 4,699,153 A 10/1987 Shevrin et al.
7,207,804 B2 4/2007 Hersh
(Continued)

FOREIGN PATENT DOCUMENTS

CN 201310203098 8/2013

OTHER PUBLICATIONS

Jeff Conklin, Ph.D., "Dialogue Mapping: Building Shared Understanding of Wicked Problems," Chapter 1, Wiley, Oct. 2005.
(Continued)

*Primary Examiner* — Oleg Survillo
*Assistant Examiner* — Christopher P Cadorna
(74) *Attorney, Agent, or Firm* — Barich IP Law Group

(57) ABSTRACT

A needs-matching navigator system and social network facilitator appurtenances including, for a large user plurality, software driven modules residing on electronic communications enabled platforms and devices. Beyond altruistically enhancing flourishing life horizons and life quality metrics, the modules facilitate (A) knowing respective user bias, profile, perspective, wellbeing orientation, and privacy preference; (B) understanding user needs description and wellbeing criteria; (C) finding answer and solutions to the needs by user biased projecting the description onto electronically stored knowledge-bases; (D) matching the user to the answers and solutions; and preferably (E) creating an instant electronic communications interactive community for the respective user, by inverse projecting large subsets of the answers and solutions back onto the large plurality of users; according to said users' profiles and needs descriptions. This navigable community may be classified into spontaneous castes; having various degrees of relevant understanding, expertise, experience, and/or curiosity about these answer and/or solution projections.

4 Claims, 3 Drawing Sheets

Related U.S. Application Data continuation of application No. 14/799,028, filed on Jul. 14, 2015, now Pat. No. 10,116,765.

(51) Int. Cl.

| | | |
|---|---|---|
| *G06Q 50/00* | (2012.01) | |
| *G06Q 30/02* | (2012.01) | |
| *G06Q 30/06* | (2012.01) | |
| *G06Q 30/00* | (2012.01) | |
| *G06N 3/02* | (2006.01) | |

(52) U.S. Cl.
CPC ......... *G06Q 30/0241* (2013.01); *G06Q 30/06* (2013.01); *G06Q 50/01* (2013.01); *G06N 3/02* (2013.01)

(56) References Cited

U.S. PATENT DOCUMENTS

| | | |
|---|---|---|
| 2004/0116778 A1 | 6/2004 | Mauldin |
| 2005/0117527 A1 | 6/2005 | Williams et al. |
| 2010/0009325 A1 | 1/2010 | Afanasiev et al. |
| 2010/0055658 A1 | 3/2010 | Sturm et al. |
| 2011/0020778 A1 | 1/2011 | Forbes |
| 2011/0118555 A1 | 5/2011 | Dhumne et al. |
| 2012/0071785 A1 | 3/2012 | Forbes |
| 2013/0035946 A1 | 2/2013 | Ratan et al. |
| 2013/0066968 A1 | 3/2013 | Ziegler |
| 2013/0073474 A1 | 3/2013 | Young |
| 2014/0106318 A1 | 4/2014 | Wright |
| 2014/0214709 A1 | 7/2014 | Greaney |
| 2015/0262499 A1 | 9/2015 | Wicka et al. |
| 2016/0283678 A1 | 9/2016 | Ram |

OTHER PUBLICATIONS

Ricardo Matsumura de Araujo, "Memetic Networks: problem-solving with social network models", Dec. 2010.

Muhammad Z.C. Candra, Hong-Linh Truong, and Schahram Dustdar, "Provisioning Quality-aware Social Compute Units in the Cloud," Distributed Systems Group, Vienna University of Technology, 2013.

Diane H. Sonnenwald, "Evolving Perspectives of Human Information Behavior: Contexts, Situations, Social Networks and Information Horizons," published in Exploring the Contexts of Information Behaviour, 1999.

NEEDS-MATCHING NAVIGATOR SYSTEM

This application is a continuation of U.S. patent application Ser. No. 16/148,693, filed Oct. 1, 2018, entitled "NEEDS-MATCHING NAVIGATOR SYSTEM", which is a continuation of U.S. patent application Ser. No. 14/799,028, filed Jul. 14, 2015, now U.S. Pat. No. 10,116,765, entitled "NEEDS-MATCHING NAVIGATOR SYSTEM", which are hereby incorporated by reference in their entirety.

TECHNICAL FIELD

Generally, the present invention relates to software systems enabling a convergence of understanding personal-situation and human-centric questions with a convergence of providing respectively appropriate answers, advice, opportunities, affiliations, and associations. Alternately stated, the present invention is directed to helping individuals achieve life-beneficial access to a convergence of data networks with social networks. More specifically, the present invention relates to a plurality of software collaborating systems directed to expanding the universe-of-choice for those seeking answers and alternatives, and to facilitating appropriate social networking relationships therewith; which typically include associated electronic communications conduits.

BACKGROUND ART

In order to appreciate new, useful, and innovative aspects of the Needs-Matching Navigator System (hereinafter "MNS"), a closer look at some basic metrics is appropriate; metrics such as "best", "life-beneficial", and even "orientation". These and other terms (as will be described hereinafter) will be used to portray aspects which may be helpful for a user to increase his long-term life-flourishing level; which in-turn are metrics which often may convey vastly different quantitative and qualitative valuations. Simply stated, to teach MNS embodiments, many subjective evaluations (and associated terms of the art) will be objectified in their respective contexts.

For example, "search engines" generally operate to answer user queries. Today, these queries are typically expressed as a series of key words, and are typically understood as a collection of synonyms and phrases, which are built from combinations of those words and synonyms.

Search engines generally bias their results to queries according to a predetermined preference orientation. Some search engines bias "answers" according to commercial interests; such as competing advertising campaigns.

Other search engines bias "answers" according to an evolving guess about the profile of the questioner (user). User profiles are typically built from the confluence of user query key words in conjunction with any profile disclosure by the user. In actual use, the user profile is then often combined with presumptions about external profile data; which have a high likelihood of being descriptive of the questioner. In contrast, internal search engines (such as those used at call centers) operate against a background of service agreements, customer contracts, supplier specifications, management policies, and associated documentation libraries; which may be constantly updated or randomly out-of-date. Thus in most cases, an answer from a search engine is biased in favor of various search engine owner interests; even if at the expense of the questioner (user) by providing biased less-than-best query results.

Now, even if a search engine were altruistically trying to provide a "best" answer to a user query, this very notion "best" has a multitude of meanings; both subjective and even objective. A simple notion "best" may indeed be straightforward for single variable equations; where a best result is a maximum or a minimum value result. For slightly more complex multi-variable equations (or more typical simultaneous equations sets), finding "best" may first reduce a problem to a smaller number of aggregated variables. Common examples of dual aggregated variables are "risk" and "reward, "psychological" and "physical", "cost" and "benefit", and the like. However objective such a transformation may seem, subjective factors inherently perturb these assignments and their respective quantification. Accordingly, seeking an optimal trade-off between dual aggregated variables, while simplifying the mathematics required, typically introduces subjective biases; thereby putting the quality of the solution as "best" into doubt.

Even if multivariate problems (the abstract user "query") could be objectively quantified and mathematically optimized, for long term operations, where many decision are made, a best strategy may not even be the sequence of the best decisions. Some well known examples are the famous gambits and sacrifices in chess, the diversions in battle, and the "false flag" attack in politics. Marketing, health care, game theory, and even complex industrial fabrication protocols all involve searching such respectively complex solution spaces; where often, a novel heuristic will find an example of a class of better results than a currently accepted "best practices" teaches.

Exploring the complexity of finding a best solution to a multivariate problem, one step further, all problems suffer from the influence of hidden variables, combined effects of tertiary factors, flaws in the reduction of the problem to an abstract representation (a query), and falsifiability issues; which are inherent to the "culture" of the user (who brings the query), the search engine or expert (who answers the query), and (returning to the underlying mathematics and logic of the question-answer asymmetry) how the temporal resolution of the respective issues are considered. One instant example of this issue will suffice. If the standard medical protocol says that best practice is for a patient with symptom "A" to be treated with procedure "B", then the attending physician should still (at least) ask if that is as true for a five year old patient as it would be for a ninety five year old patient. Economic example of this style of strategic error are to be found in countless case studies of corporate history; and in the analysis of the decline of nations and of empires.

Simply stated, there is a longstanding need in the art for improvements in the contextual appreciation of "best"; particularly when sorting answers to a query and considering the respective questioner's circumstances. Returning to the very beginning of this section, "life-beneficial" and even "orientation" represent aspects of appropriate knowledge management that are worthy of consideration; and may be objectified as metrics, per se.

While tersely summarized as a longstanding need, there are interesting, relevant, and significant prior art discussions for human centric data systems; even including associated social networking. Some typical examples are:—http://cognexus.org/wpf/wickedproblems.pdf "Wicked Problems and Social Complexity" Chapter 1 of Dialogue Mapping: Building Shared Understanding of Wicked Problems, by Jeff Conklin, Ph.D., Wiley, October 2005. This book is about collective intelligence: the creativity and resourcefulness that a group or team can bring to a collaborative problem.— http://www.lume.ufrgs.br/bitstream/handle/10183/25515/000753513.pdf? . . . 1 "Memetic Networks: problem-solving with social network models" Ricardo Matsumura De Arújo;

2010. "We frame problem solving as a search for valid solutions in a state space and propose a model—the Memetic Network—that is able to perform search by using the exchange of information, named memes, between actors interacting in a social network. Such model is applied to a variety of scenarios and we show that the presence of a social network greatly improves the system capacity to find good solutions."—http://www.infosys.tuwien.ac.at/research/viecom/papers/ICSOC2013-SCUProvisioning.pdf "Provisioning Quality-aware Social Compute Units in the Cloud" Muhammad Z. C. Candra, Hong-Linh Truong, and Schahram Dustdar; Distributed Systems Group, Vienna University of Technology. "To date, on-demand provisioning models of human-based services in the cloud are mainly used to deal with simple human tasks solvable by individual compute units (ICU). In this paper, we propose a framework allowing the provisioning of a group of people as an execution service unit, a so-called Social Compute Unit (SCU), by utilizing clouds of ICUs. Our model allows service consumers to specify quality requirements, which contain constraints and objectives with respect to skills, connectedness, response time, and cost. We propose a solution model for tackling the problem in quality-aware SCUs provisioning and employ some meta-heuristic techniques to solve the problem. A prototype of the framework is implemented, and experiments using data from simulated clouds and consumers are conducted to evaluate the model."— http://eprints.rclis.org/7971/1/isic98+paper.pdf "Evolving Perspectives of Human Information Behavior: Contexts, Situations, Social Networks and Information Horizons" Diane H. Sonnenwald; University of North Carolina at Chapel Hill. "This paper presents an evolving framework of human information behavior. The framework emerges from theories and empirical studies from a variety of research traditions, including information science, communication, sociology and psychology, that inform our understanding of human information behavior. First, fundamental concepts, such as context, situation, and social networks, are discussed. Using these concepts, a series of propositions that strive to elucidate, that is, provide a framework for exploring, human information behavior are proposed. Information human information behavior, including information exploration, seeking, filtering, use, and communication, are included (to varying degrees) in the framework. The framework also incorporates cognitive, social, and system perspectives. A key conception the framework is the notion of an "information horizon." Within any context and situation is an "information horizon" in which individuals can act. Information horizons, which may consist of a variety of information resources, are determined socially and individually, and may be conceptualized as densely populated solution spaces. In a densely populated solution space, many solutions are assumed, and the information retrieval problem expands from determining the most efficient path to the best solution, to determining how to make possible solutions visible—to an individual(s) and to other information resources."

Thus, it is fair to say that there are various search engines, heuristics and systems which consider (or could be used to consider) needs matching; particularly if the needs could be expressed and understood, and particularly if the respective questioner's (user's) "life-beneficial" "orientation" could somehow be appropriately convolved to stratify a cloud of possible respective answers. Alternately stated, there is still an need in the art of needs matching for improvements of needs expression, needs understanding, "life-beneficial" "orientation" convolution, answers stratification, and the like. Furthermore, typically of greater importance, having arrived at a perhaps best set of appropriate answers to a question, there is a longstanding need to "best" match at least one of these answers to a real-world opportunity for a respective realization.

Returning to the example of a medical procedure, the first part of a "best" answer is knowing what the "best" appropriate medical procedure would be, and the next part is (or may be) "best" matching that answer to actual real-world availability within the real constraints of cost, time, and the like. Simply stated, in the context of a user's circumstance, "life-beneficial" and "orientation" are not necessarily synergistic; so navigation of needs-matching is likewise a longstanding problem aspect, in search of improvement.

Another longstanding need is expressed from the emerging abundance of Social Network Facilitator Appurtenances; each, in some aspect, attempting to enable a respective advice networks. Wikipedia's description of "Virtual Community" (VC) suggests that: VC (social networks) "all encourage interaction, sometimes focusing around a particular interest or just to communicate. Some virtual communities do both. Community members are allowed to interact over a shared passion through various means: message boards, chat rooms, social networking sites, or virtual worlds"; and then goes on to describe exemplary VCs that are focused on health, civic participation, and communications. Apparently, all of the examples diverge from scalability, as organizational behavior and economics begin to conflict with the generalization of ordinary use.

Two exemplary Social Network Facilitator Appurtenances are respectively from Microsoft and more recently from Google.

"Windows Live Spaces", originally released in 2004 as "MSN Spaces" and shut down in 2011, was a set of general-purpose tools for users to reach out to others; by publishing their thoughts, photos and interests. Among its many fatal shortcomings, Windows Live Spaces failed to scale up into the sparseness of cyberspace. Simply enabling interactive web-publishing did not answer amorphous needs of human connectivity; nor was it economically competitive with other similar social networking facilitators.

Google+ (pronounced "Google Plus"; previously called "Google Circles") is considered the Google's fourth social networking appliance (2011-ongoing), following Google's "Orkut" (2004-ongoing; Brazil only), "Google Friend Connect" (2008-2012), and "Google Buzz" (2010-2011). Google+apparently serves two functions; giving users a mutual social networking appliance and providing Google with a centralized profile for Google Services (YouTube, Gmail, Google Maps, etc.). While Google+helps Google to build a unified user-tracking monetization profile, there is no indication that this profile is being applied to altruistically advance the user's wellbeing; neither according to any vague human-centric Google wellbeing concept, nor according to any explicit maturing respective user's wellbeing concept.

Furthermore, since these needs remain unanswered, a plethora of narrow-purpose social networking facilitator systems have emerged; such as "Social Network and Location-Based Employment Placement System and Method" [US 20130073474]—which is "directed to an on-line and mobile location-based system blending social, security and communication components to help persons, including youth, find employment and internship opportunities within a community. Utilizing users' social networks, Geo-location, dynamic and real-time information feeds, and proprietary prediction and security technologies, the disclosed system provides a system to create validated personal profiles for job seekers and posters, to browse and search job listings, to communicate about with other users about employment opportunities. The present invention ('474) also assists job posters and organizations to communicate about available projects within their hyper-local area." The very narrowness of this '474 system ("without prejudice") testifies to a knowledge engineering failure; to enable open-purpose needs-matching systems.

Accordingly, the longstanding needs for progress in global peer-to-peer communications, according to best practices of Need-Matching issues (spontaneously arising for respective individuals' problems and circumstances), remain in search of progress; particularly scalable progress. More broadly stated, finding "the anyone who can best contribute to an appropriate solution to a problem of anysomeone" would be an altruistic milestone event in human history; and progress in that direction is what each of us (in our hearts) would consider evidence of a better world. In the light of universal access to global communications, no cry for help should go unanswered; and no confusion or ambiguity about the nature of that cry nor the peculiarity of that help should stand as a barrier to enabling best-practices answering.

DISCLOSURE OF INVENTION—CONTEXTUAL DEFINITIONS

By way of introduction, an objective of embodiments of the Needs-Matching Navigator System (referred to herein as "MNS") is to create, facilitate, and/or manage a social network of members; to access, integrate, and/or improve ICT (Information Communication Technology), and/or to help MNS members improve their lives. Another objective is to help MNS users to find and define their needs and/or to match the best solutions available to their needs. It is a particular objective to facilitate methods to define their needs, to locate and/or configure solutions to match their needs, answer their needs, solve their needs, and/or improve their needs (e.g. direct them to ways and means for revitalizing their condition). Furthermore, another objective relates to optimization, maturing purpose, and/or improvement of the life of each MNS user and/or groups that the user is a member of.

Stylized grammatical references herein to a male gender and/or to a female gender are not intended to be understood as gender specific, gender biased, gender restricted, nor gender relevant.

Now, for convenience of expression, the following alphabetically-listed terms (with their introductory descriptions, discussions, and definitions) relate to instantiations, items, attributes, concepts, and aspects; which are used in the context of the MNS examples and components, and are respectively further described therein.

Appurtenance: Any hardware and/or software and/or data-product accessory (or other item) associated with MNS; including MNS user/member social networking; MNS user/member privacy preserving data-product access and interaction for MNS non-members; MNS related portals and archives; MNS graphic interfaces and formats; graphic link-organizers, and the like Convolve: To apply a first function, definition, or dataset onto a second function, definition, or dataset in order to produce a third function, definition, or dataset; that is typically viewed as a modified version of one of the original first function, definition, or dataset; an expression of orderly complexity that was derived from facile-scale mechanical usages: to wind or to roll or to coil or to twist together; accordingly to convolve is to form the convolution of something with something else and/or to compute a respectively defined convolution function descriptive thereof; accordingly being convoluted implies being complex, being intricate, or being complicated. Regarding descriptive and quantitative data, a convolution is a data set transformation performed according to some necessary combination of logical and functional applications; as would be understood by a database administration professional.

From another vantage, symbols and referents involve different protocols of convolution.

Symbols may express a need to know, and other symbols may answer that need; in the form of documents and explanations. Search engines may provide these documents and MNS social networking may provide teachers and/or colleagues to help understand these documents. Simply stated, in many cases knowledge needs apparently only require knowledge answers; whereas in fact they often require educational processes to understand that knowledge.

Referents may express a physical need, such as for food, clothing, shelter, medical treatment, care, community, or the like. Solutions to referent needs often involve a convolution of knowledge, logistics, physical resources, and actions. Simply stated, referent needs typically require solutions, which in turn include a need for respective answers.

For answering complex needs to know and for answering most referent needs, beyond any process to understand these needs, there typically are various strategies and scenarios to decompose these needs into sub-problems, answer the sub-problems, answer the recombination of the sub-problem answers, and convolve the sub-problem answers and the recombination answers back into a solution to the referent need. For example, a need for food may be subdivided into finding the food, paying for the food, and delivering the food; which must be respectively solved and convolved back together in a logistically coherent way.

Currencies: Various real and abstract monetary units are often significant when dealing with realities of appropriate costs, funding, income, expenses, and the like. Furthermore, there is sometimes a preference to define several components, such as cost of a solution, range of cost that the user prefer, donation cost, reward, price for providing information or solution, or the like.

The currencies can be combination of real currencies (dollar, Euro, etc.), commodities (gold, silver, etc.), virtual currency (flight mileage, Bit-coins, coupons, vouchers, etc.), services (an hour of helping someone, community service, etc.), or the like. Furthermore currencies may include indexing (cost of basket of products, cost of living, etc.), or to an arbitrarily defined MNS virtual currency, or to shares in a company or in aggregate of companies (NASDAQ Composite, S&P 500, Russell 1000, NYSE Composite, DJ US TSM Index, etc.), or to a social network (such as including membership, access, rights, privileges, status, or notoriety therein), or to the valuation of shares in the organisation(s) which operate a MNS. Furthermore, MNS preferably defines an optional or arbitrary exchange mechanism—to swap or translate or exchange one type of currency to another type.

For Currency related "Wellbeing Currency", see "Disclosure of Invention—Description of Embodiments" section (below).

Database: Any list, file, repository, taxonomy, or knowledge-base that is electronically stored and enabled for searching therein. Also, a software driven "Information Repository Management" module for managing respective selected MNS module derived digital data information as at least one knowledge-base Information Repository; and the Information Repository includes a plurality of networked data storage libraries, gateway type protocol for information interfacing there-between, and a third-party-accessible information auditing-review record thereof.

For Database related "Projection", see "Disclosure of Invention—Description of Embodiments" section (below).

Members: Users of embodiments of MNS; and/or a trustworthy person, representative, caretaker, trustee, parent, guardian, software, or robot which take care of some respective user relationship—ostensibly directed to improve the respective MNS user's life.

For Members related "Caste", see "Disclosure of Invention—Description of Embodiments" section (below).

Needs: Circumstances and expressions of circumstances which can substantially be hierarchically classified into attributes and/or tags; also synonyms, replacements, translations, and substitutions—which can be expressed as a decomposition of one to many, a direct transformation of one to one, a convolution of many to one, or a frame of reference superposition substitution of some to others, or the like.

Needs may relate to referents (such as products, services, purposes, methods, applications, another human being, a group, an organization, a partner, an institution (such as a University), a potential answer to a decision, a subject for further study, a type of food, an exercise, or the like) or they may refer to a combination of knowledge and respective understanding. Needs may be expressed as questions; such as "What is good for me according to my state and priorities?", "What type of education will be best for my child", etc. Accordingly, as is reasonable for the complexity and ambiguity of any expression of needs, potential solutions for the needs and potential providers of such solutions are to be understood as being in the context of various respective theories and models; which may be far from definitive, inclusive of uncertainty and ambiguity, and inclusive of indeterminate dependencies. Preferably, for solutions having geographic proximity components, a map will be provided or generated with location information to better express constraints on users' needs, solutions, suppliers, and the like.

For Needs related "Needs Description", see "Disclosure of Invention—Description of Embodiments" section (below).

Profile: Typically, any exemplary combination of (A) user provided disclosure about the user, such as name, age, address, occupation, education, memberships, free-form descriptions (even including factual, emotional, and perceptual aspects), or the like; (B) descriptions and characterizations of the user that can be discovered using public data bases, private health records (with user permission), commercial databases, or even from comments or rank or grade provided by other users, or the like; (C) real time or summary metrics received about the user, such as GPS location of his mobile device, physiology monitoring updates, a vibration spectrum from an accelerometer of his mobile device, or the like; and (D) metrics discovered that further characterized the metrics received, such as weather at the reported location, risk or reward potential at the reported physiology, or the like; (E) preferences and weights for attributes of potential solution or need; etc.

Trust: Among aspects of MNS, a very important feature is a promise to members and users that MNS will try to find the best respective solution to improve the user life—according to the users priorities; wherein no suppliers can buy a change of priority for an MNS ordering list of solutions. MNS is intended as a quality standard of relationship for helping the user, both to define his needs and to match these needs to best solutions. Preferably each MNS embodiments instantiation is organised as a not-for-profit organization; such as a social enterprise, trust, charity or foundation; or as an organization whose revenue and profit will not be generated by promoting potential suppliers or by advertising clicks or the like, but can be generated by a member's fees, a user's donations, contributions when receiving a good solution; or general contributions, donations, or the like.

Accordingly, MNS suggests various methods of economic self sufficiency; without selling advertisement (as per the Google or Facebook advertising sales economic models). MNS economic self sufficiency is by one or a combination of: donations, membership, cost reimbursement, donation commitment for value of received solution, percentage (or other formula) from cost or value of a solution, or from a user payment for a solution by a provider (commission). By one scenario, a user selecting an MNS solution, which caused the user to transact with a provider, will likewise commit the user to a fixed or proportional donation to MNS or to an MNS user-with-Needs. By another scenario, an MNS can be a free service, but encourages members to donate to a supplier who supplied the answer to their needs; and a percentage of this donation will be donated to the MNS. A transforming variation of this scenario is that the total donation will be paid to the MNS, and the MNS will pay some (or even most) of it to the supplier. Another aspect of trust relates to data characterizing identity, profile, personalization, and preferences. When a user provides or allows MNS to keep, access, and monitor such data, then thresholds and potential-triggers for needs may become actualized according to preferred, predetermined, predictive, or presumption parameters; such as time, location, individual information, and state (examples: tooth pain can be a trigger to a need to find a dentist; life events such as birth, wedding, death of a relative can be a trigger to specific needs—that the MNS can help the user to define and solve).

As an MNS can become a very comprehensive system, even in some specific areas, the ongoing comprehension process means that some vertical domains or horizontal parameters may always include a higher density of detail and variability than others. Nevertheless, it is also possible to use the same software to manage MNS in several areas. For example: an MNS may include much more "knowledgeable" detail about some geographical areas (country, state, province, city, etc.) than in others. Likewise, some specific domains of services or products may dominate the MNS "Needs-Knowledge portfolio"; such as those related to improving wellbeing, health, or education. Furthermore, the MNS portfolio may be more "understanding" for various age groups, social or political orientations, or other profile attribute than others; such that MNS may be more relevant to young people, people belonging to a definable belief group, or to a membership organizations (such as for people who care about the environment, Green Party, parents, etc.).

Accordingly, in practice, trust nevertheless returns MNS embodiments to have taxonomies, dictionaries, and networks of item-property-detail instantiation relationships to help define and search needs, and to "target" appropriate solutions, compatible classes and attributes (including features, aspects, synonyms, sub-needs, sub-solutions, etc.). Items such as a members can be part of more than one group or class; such as according to location, gender, education, social group, specific choice, etc. Needs and solutions also can be part of several classes; such as need of learning to manage and improve wellbeing can be part of classes of wellbeing, life skills, and education. Various further aspects of trust will emerge from the detailed MNS examples hereinafter. Another aspect of trust embedded in the MNS process is validation and confirmation of any important information either reported by the user, or found by the MNS from another source.

Another aspect of trust relates to agreements between respective users of the Needs-Matching Navigator System and an organization which provides enabled modules of the system; according to the present invention. The purpose such agreements, inter alia, is to create mutual trust. An exemplary agreement includes, inter alia, undertakings whereby (I) the provider organization agrees (a) not to disclose confidential and private information of the user to third parties without permission of the respective user, (b) to enable the respective user to view and update the information that the provider manages regarding that user's profile, (c) to be honest and loyal to the respective user and try to help him/her to find the best solutions that match his/her needs according to his/her profile, preferences, and weighting criteria, and (d) not to be influenced by suppliers or advertisers in the provision of System services to the respective user; and (II) the user undertakes (a) to be honest and provide true information to the System regarding his/her identity, his/her information, and respective/ongoing feedback that he/she will provide in the future, and (b) to try to find and chose solutions that may improve his/her wellbeing.

Wellbeing: A broadly accepted term-of-the-art which conforms to various multi-parametric quantification methodology definitions; albeit Wiki describes it as "a general term for the condition of an individual or group, for example their social, economic, psychological, spiritual, satisfaction, health, or medical state; high wellbeing means that, in some sense, the individual or group's experience is positive, while low wellbeing is associated with negative happenings." Notwithstanding, wellbeing may be applied to relate to a narrow instantiation; such as the wellbeing of a person's heart, liver, car, conditioner, and the likes. Another example of a narrow instantiation of wellbeing is level of user satisfaction from a specific solution that the MNS may provide.

Gallup-Healthways "Wellbeing Index" ® (registered trademark of Gallup, Inc) describes it as "how people think about and experience their lives"; which then becomes a basis for respective extensive statistical analysis and discussion in their "State of American Wellbeing 2013 State, Community, and Congressional District Analysis" Report. In addition to regional metrics, Gallup has extended this to the workplace and to personal assessment programs; such as "The primary component of Gallup's Wellbeing program is the "Wellbeing Finder™" an assessment that measures your wellbeing over time. When you take the "Wellbeing Finder™" you will receive a scorecard with your overall wellbeing score as well as your score in each of the five essential areas of wellbeing: Career Wellbeing, Social Wellbeing, Financial Wellbeing, Physical Wellbeing, Community Wellbeing." Gallup has gone further, by enabling three commercial products: "Daily Challenge™" for individuals, "Blue Zone Project™" for communities, and "Healthways™" for organizations. However, Gallup is far from alone in the development and application of wellbeing technologies.

On a still larger scale, wellbeing has become an almost competing standard of metrics for national assessment. The National Accounts of Wellbeing Indicators on these websites represent working models of measures which governments and NGOs use to monitor the wellbeing of citizens: http://www.nationalaccountsofwellbeing.org/learn/measuring/indicators-overview.html; http://www.oecd.org/general/compendiumofoecdwellbeingindicators.htm & http://www.oecdbetterlifeindex.org/#/12200515555; http://www.oecd.org/statistics/Guidelines%20on %20Measuring%020Subjective%20Well-being.pdf; and http://www.widerunu.edu/research/projects-by-theme/poverty-inequality/en_GB/social-development-indicators-measuring-human-wellbeing/. A particular user-friendly ensemble of wellbeing definitions and assessments are fully operational in Canada: such as 'Indicators of Wellbeing in Canada' http://www4.hrsdc.gc.ca/h.4m.2@-eng.jsp "gathers data from different sources and presents a comprehensive, up-to-date picture of the Wellbeing of Canadians and Canadian society."

Each of these wellbeing definitions and countless other wellbeing ontologies are respectively characteristic of the perspective of these organizations. However, in a larger context, that is in the MNS context, wellbeing is defined from the perspective of each user, scaled according to their respective profiles, and expanded according to clouds of synonyms, frequently occurring proximate word clusters, and the like. For the organizational examples cited, this is likewise substantially true; because of the virtual certainty that even these organizational definitions and ontologies will evolve over time; into other clusters of labels, which chronologize transformational shifts of user perspective.

Alternately stated, "Wellbeing" relates to all life-process states; which typically includes exemplary domain-attributes, such as those characterizing personal, family, physical, emotional, mental, social, career, financial, community, environmental, spiritual, subjective happiness, and like aspects.

For Wellbeing related "Wellbeing Orientation", "Wellbeing Criteria", and "Life Quality Metric", see "Disclosure of Invention—Description of Embodiments" section (below).

BRIEF DESCRIPTION OF DRAWINGS

In order to understand the invention and to see how it may be carried out in practice, embodiments including the preferred embodiment will now be described, by way of non-limiting example only, with reference to the accompanying drawings. Furthermore, a more complete understanding of the present invention and the advantages thereof may be acquired by referring to the following description in consideration of the accompanying drawings wherein.

DISCLOSURE OF INVENTION—INDUSTRIAL APPLICABILITY

Figure 1:
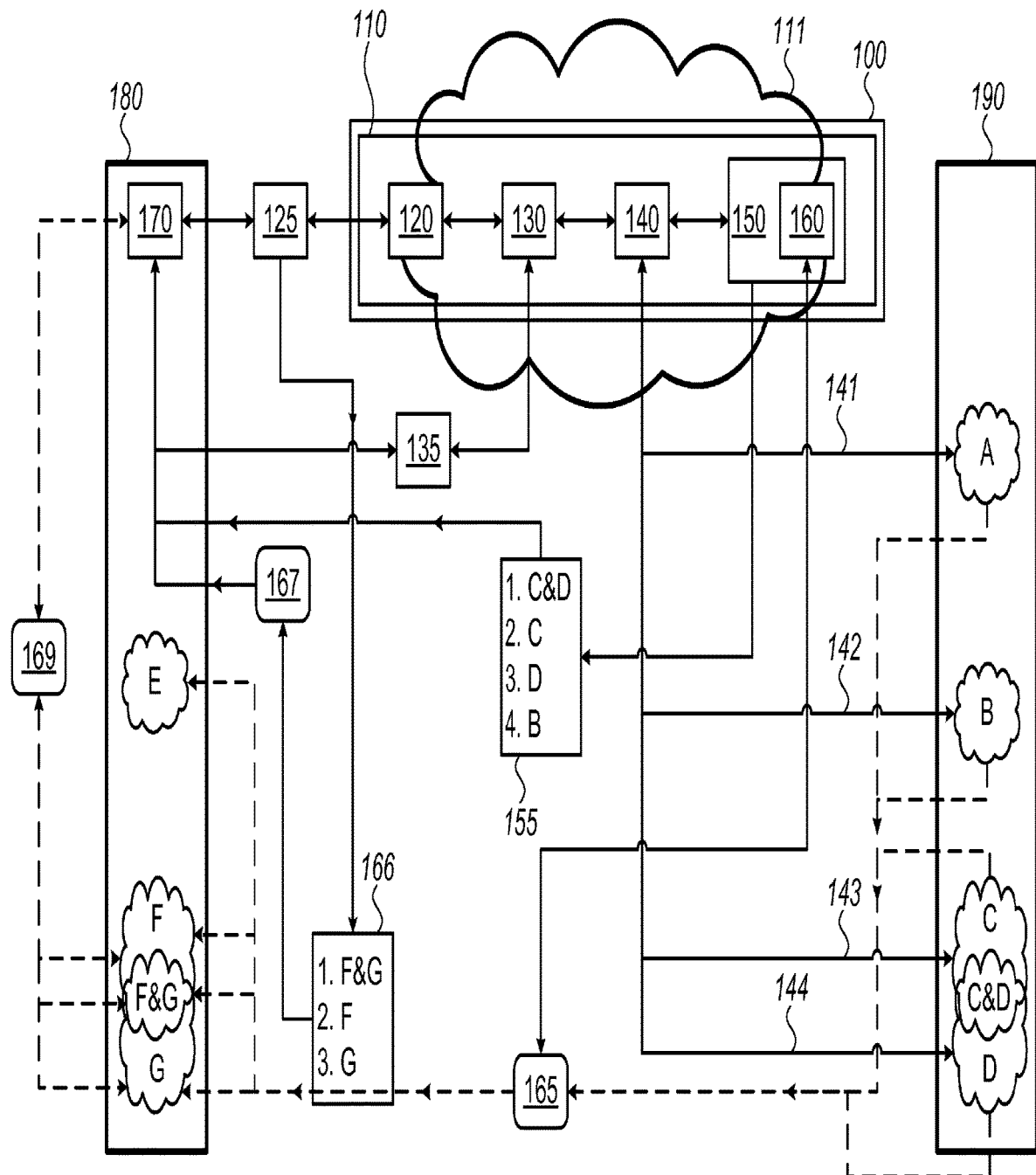
FIG. 1 is a schematic view of a Needs-Matching Navigator System, including a respective MNS Social Networking feature for a user's consideration.

A presentation of selected ergonomic, economic, and technical issues which highlight Advantages, Objects, and Benefits of embodiments of the Needs-Matching Navigator System and respective Social Network Facilitator Appurtenance embodiments.

Ergonomic Issues: First, by example, a researcher is looking to find an appropriate grant for what the researcher actually does (rather than rewrite what the researcher does to somehow fit an inappropriate grant) or a social worker is looking for a government or NGO program that best fits a clients situation; and without prior experience for an identical situation or personal access to someone who by-luck happens to know, the complexity of matching a set of interrelated needs with a solution is daunting, exhausting, and fraught with a sense of professional incompleteness. Basically, for personal, family, and community issues, altruistic interactive knowledge has always been a scarce resource. Simply, good advice is hard to get, and good solutions to needs are still harder to acquire. Still, today, a user's orientation and access, per se, to relevant appropriate-technology solutions is happening as knowledge and social networks respectively grow; and as commercial and even national concerns increasingly dominate (according to considerations that are not intentionally concerned with user friendliness).

If the emerging Knowledge Economy is ever to appreciate the wellbeing of individuals, then the ergonomics of information, understanding, and social relationships must become important beyond their diminishing-proportion individual-unit size. On one hand, as population grows, the individual is a smaller part of humanity; yet on the other hand, as knowledge and social networks grow, the knowledge empowered individual can communicate and influence at a time scale of appropriateness that is absolutely unprecedented. To illustrate, if there is a new horrendous disease anywhere and knowledge of it can reach the individual who can best cure it, then (where altruistic communications are operating optimally) the disease is reduced to negligible importance. Likewise, for every other problematic instantiation in the corpus of human experience, a knowledge empowered social network represents our best technology. MNS Embodiments of Best Appropriate Knowledge Ergonomics can better address that which competing ideologies have heretofore failed to resolve. Ideologies are non-scalable generalizations; while MNS is scalable to the individual and from the individual. Knowledge is not just a database of facts. Knowledge is the understanding of best practices of how to apply those facts; and networking to respective best appropriate Knowledge practitioners is an ergonomic object of MNS.

Economic Issues: For mechanical, electronic, and software-centric systems, instantiation cost seems to creep upward with increasing complexity; regardless of the economy of scale. This has been the basic rule for technology since the Renaissance. However, as the electronic topology of global empowered social networks transforms knowledge access from hierarchical and trunking systems to true multi-virtual networks, the cost-of-access to best-quality wellbeing solutions for individuals should radically shrink; because the distance between any two individuals (in the entirety of humanity) is approaching a speed-of-light empowered constant, which is substantially instantaneous. This suggests the emergence of a new medium of exchange for facilitating the barter and distribution of wellbeing Knowledge; which must eventually have a higher valuation than the accumulation of more-familiar units of stored wealth.

From another vantage, for fungible commodities, monetary instruments (such as currency and commercial paper) are substantially viable; well, at least as adjusted by taxation, charity, and social programs. A more paradoxical valuation issue comes to mind when honest people try to "pay back" a favor; because there, the circumstances are as much a part of the valuation as the favor, per se, is. Knowledge, not in the abstract but in the context of needs-matching and solutions-navigating, is less like a fungible commodity and more like a favor in the context of a maturing social relationship. This again suggests the emergence of a new medium of exchange for facilitating the barter and distribution of wellbeing. Accordingly, it is an object of MNS embodiments to help facilitate a fungible unit for wellbeing exchange; something that money has proven that it can not buy.

Technical Issues: As with the development of all emerging technologies, components and even infrastructure exists; but a paradigm and viable convolved embodiments for facilitating progress are wanting. Simply stated, as is almost always the case for inventions and innovations, the technical issue is not necessarily in finding the pieces, but in putting them together properly. As is so often the case in the history of technology, "properly" means having appreciated the relative importance, size, and strength of the components and of their mutual attachments; otherwise the embodiment fails, and the paradigm that conceived it returns to the murky stew of an inventor's simmering ideas. For MNS, "properly" means with a diligent awareness of and concern for respective MNS user wellbeing.

Machines are not always defined as including gears or levers, nor metal parts or lubricated joints. Society is a machine. It is much in need of improvement; as is obvious from the wastes of wellbeing disparity, mission-forgotten wars, and other bubble-inspired fads. Perhaps the simplest way to characterize best-relevant knowledge in social networks is re-thinking (new algorithms and associated use of data structures) for navigating that knowledge between needs and solutions. Furthermore, perhaps social-technology progress is more about finding better systems for helping individuals, families, neighborhoods, communities, and other still larger groups to cooperate; by at least considering better answers and solutions to their respective needs. Life's very complexity-of-variability challenges this simplistic assessment; even as every persons' respective technical problem is an ever changing search to better their wellbeing.

If we were considering the engineering of a better being, then there is a case for investing in more brain (or wisdom); because war, vandalism, and domestic violence are proof that there is already too much brawn. MNS is a scalable workman's improvement to the technology of knowledge networks, as they converge with social networks; and a system to individualize them into humanity networks. In some aspects, MNS constitutes new use for existing technology. In other aspects MNS constitutes changes and improvements in those technologies; to make MNS more user friendly, more trustworthy, and more sensitive to user variability. This vantage is better appreciated from the any example where understanding knowledge is a substantial improvement beyond the base threshold of finding that knowledge. By example, for any machine or component thereof, respectively understanding it better is necessary to enable/cause a better use of it; likewise, for any social, economic, psychological, spiritual, emotional, or medical aspect.

Nevertheless, MNS also relates to narrow wellbeing-inspired knowledge engineering tools; such as (A) a Graphical Link Organizer ("GLO"), which helpful for user's understanding of results from an MNS type inquiry for answers and solutions, and which is helpful for understanding most highly multi-parametric knowledge base extractions; (B) an MNS Appurtenance providing an alternative public access electronic communications protocol; (C) to electronic facilitation of a user appropriate social networking search-and-surf transitioning environment experience; and to numerous other wellbeing-maturation products, supports, and services. An MNS GLO embodiment may include audio content, audio interpretation, audio recognition, text to voice transformation, voice to text transformation, grammar parsing, language translation, and the like.

DISCLOSURE OF INVENTION—DESCRIPTION OF EMBODIMENTS

The aforesaid longstanding needs are significantly addressed by embodiments of the present invention, which specifically relates to converging Knowledge Networks with Social Networks. The instant algorithms, methodologies, and protocols are especially useful in networking to a best appropriate Knowledge practitioner; and for facilitating a fungible unit for wellbeing exchange.

In this context, it is significant to note that MNS is substantially about social networking; wherein each member wants to improve his respective wellbeing and to help others to improve their respective wellbeing, and wherein each member trusts the service and the information which MNS provides. Likewise, it is significant to note that respective user trust of MNS is substantially because he appreciates that (according to substantially best practices) all the MNS information is reliable and validated by the MNS's process; and he also appreciates that MNS will not be biased by any potential seller or provider, but will try to find the best solution for the respective user's needs and criteria. Accordingly, for a new user (for whom MNS does not hold any information with regards to his wellbeing orientation, wellbeing criteria, and such), by one exemplary scenario, when this new user would like to find a best solution (or list of best solutions) for a specific need according to his criteria (wherein the criteria is similar to wellbeing criteria: a weighted preference list of attributes/features/aspects for his needs or the solutions he's looking for), then MNS will find the best solution or list of solutions, that will maximize the user's satisfaction, according to the user's weighted criteria for the attributes (including features, aspects, etc) and the rating of these solutions (including rating of the attributes by experienced users).

Simply stated, for MNS, navigating a user to communicate with someone who understands relevant knowledge is usually more important to facilitating solving a user need than is finding that relevant knowledge. More simply stated, IF a user understood the relevant knowledge (required to answer his need), THEN the user only may need a Knowledge Network (search engine and knowledge base); ELSE the user needs (MNS) a Social Network (Navigator) to help educate the user about how to apply relevant knowledge (to answer his need). Most simply stated, every user with a need would feel more confident if (using an MNS) the user could get quality advice from someone more knowledgeable in the area of his need—if that someone was also sensitive to what might be appropriate to the user's circumstances. Often that special MNS someone is either an expert in that area of need or at least is an individual who has already experienced traversing a substantially similar need, or an experience biased software module that can provide such expert knowledge, or the like.

Turning to FIG. 1, this invention relates to numerous embodiments, variations, and constructions of a needs-matching navigator system (100) (and to related social network facilitator appurtenances) for a large user plurality. The system includes software driven modules residing on electronic communications enabled platforms and devices (110). Beyond altruistically enhancing flourishing life horizons and life quality metrics, the modules facilitate (A) knowing (120) respective user bias, profile, perspective, wellbeing orientation, and privacy preference; (B) understanding (130) user needs description and wellbeing criteria; (C) finding (140) answers and solutions to the needs by user biased projecting (relevantly compliant with the user's wellbeing orientation and criteria—which in turn must be the user's respective need) of the description onto electronically stored knowledge-bases; (D) matching (150) the user to the answers and solutions; and preferably (if needed or if indicated as user desirable) (E) creating (160) an instant electronic communications interactive community for the respective user, by inverse projecting large subsets of the answers and solutions back onto the large plurality of users; according to the users' profiles and needs descriptions. Furthermore, this navigable community may be classified into spontaneous castes; having various degrees of relevant understanding, expertise, experience, and/or curiosity about these answer and/or solution projections.

MNS is vastly scalable family of embodiments, instantiations, variations, and appurtenances. For clarity of understanding MNS, here is a simple "most everyone is experiencing this" type example, where MNS can positively impact an ongoing issue; improving the quality of self-education. Other examples might relate to (A) configuring a collection of knowledge, goods, services, infrastructure and financing to help solve a problem; (B) configuring a transition from a virtual community of individuals with a similar goal into a sub-set physical community of mutually proximity individuals; and the like. After the simple "most everyone is experiencing this" type example is described, some MNS context terminology and numerous MNS embodiments will be described in increasing detail.

A simple scenario MNS example: "Self-Education" (formally called "Auto-didacticism") is perhaps the best way to consider the self-study phenomenon of Internet "searching and surfing"; which is an ebb and flow of a user's "need to know" and the user's "natural curiosity". An ongoing next phase of this self-study phenomenon is the sharing of Internet links; between the user and his friends, associates, social-networking community, or the like. These shared Internet links are to most anything, from timely articles and organized course materials, to obscure movies and mundane personal photographs. Now, on the one hand, everyone would like a partner to "search and surf" with; but, on the other hand, the individual's impulsive intellectual curiosity is stifled by consensus issues arising in such a partnership. (The situation is much akin to a once-typical family trying to agree to watch a single TV station broadcast program together.) A generic MNS embodiment would seem to provide much of the self study assistance that a typical Internet solo-adventurer is wanting.

Accordingly, to help appreciate MNS, rather than instantly outlining and detailing such an MNS embodiment, here is a script of how such a self-education MNS Internet accompaniment episode might play out:

JJ (an MNS user) shares lots of data with MNS. Knowing and understanding JJ becomes a maturing relationship process for MNS. JJ has given MNS lots of personal profile information. This profile information about JJ includes: age, gender, location, education, language, motivational statements, likes, and dislikes; JJ's answers to at least one MNS respective personal profile relevant questionnaire about JJ's wellbeing orientation; JJ's free-text essay about short-term and long-term wellbeing goals; and JJ's privacy preferences instructions to MNS. Furthermore, sharing JJ's concern for privacy, MNS lets JJ view the way MNS sees JJ, the data that MNS has collected (from elsewhere) about JJ, and lets JJ comment on his degree of acceptance or rejection of any of these JJ associated profile attributes (including features, aspects, synonyms, sub-needs, sub-solutions, etc.). In considerations to JJ's wellbeing regarding JJ's own privacy, MNS provides JJ with a monitor ON monitor OFF switch; so that JJ can always change from his general privacy preferences to total privacy—whenever and for however long JJ sets the MNS monitor to OFF.

For example, JJ's privacy preferences allow MNS to monitor JJ's searching and surfing activities; albeit—not to monitor JJ's activity from the moment that JJ begins to enter information into a site; which blocks MNS from tracking much of JJ's on-line commercial activities. JJ allows MNS to monitor JJ's chat room texts, JJ's email content (albeit not to monitor email addresses), and JJ's text editing of documents on JJ's device or with JJ's cloud account. However, JJ prohibits MNS from sharing JJ's profile or activity data with anyone; except if JJ agrees to that anyone, and only after JJ reviews and approves the data content that is to be shared. Simply stated, there is a bond of Trust between JJ and MNS.

In the context of self-study, MNS monitors what JJ searches for, which sites JJ visits, how long JJ stays on those sites, and what notes JJ makes or copies while visiting those sites. The allowed monitoring provides MNS with an ongoing history of JJ"s many changing wellbeing criteria and a cumulative portrait of JJ's education level.

Now, MNS considers lots factors to better understand JJ. To texts that JJ authors and/or copies, MNS may apply at least one (standard) readability formula (typically expressed as "reading level"), grammar checker, spelling checker, and vocabulary level; which gives MNS some understanding of JJ's grade-equivalent level of literacy and articulation. MNS may also look at Internet sites that JJ visits, and consider the level literacy and articulation level of these sites, how long JJ was there, how fast JJ scrolled or navigated through the site, and the context of text (or graphics or formulas) that JJ may have copied from the site—which JJ then used to surf and search further. In addition, MNS may look at the amount of passive, active, and interactive graphics on the site. MNS may also notice the frequency of numbers, formulas, definitions, and variables in JJ's text and in Internet sites that JJ visits; to better approximate JJ's level of quantitative and/or mathematical reasoning.

Figure 2:
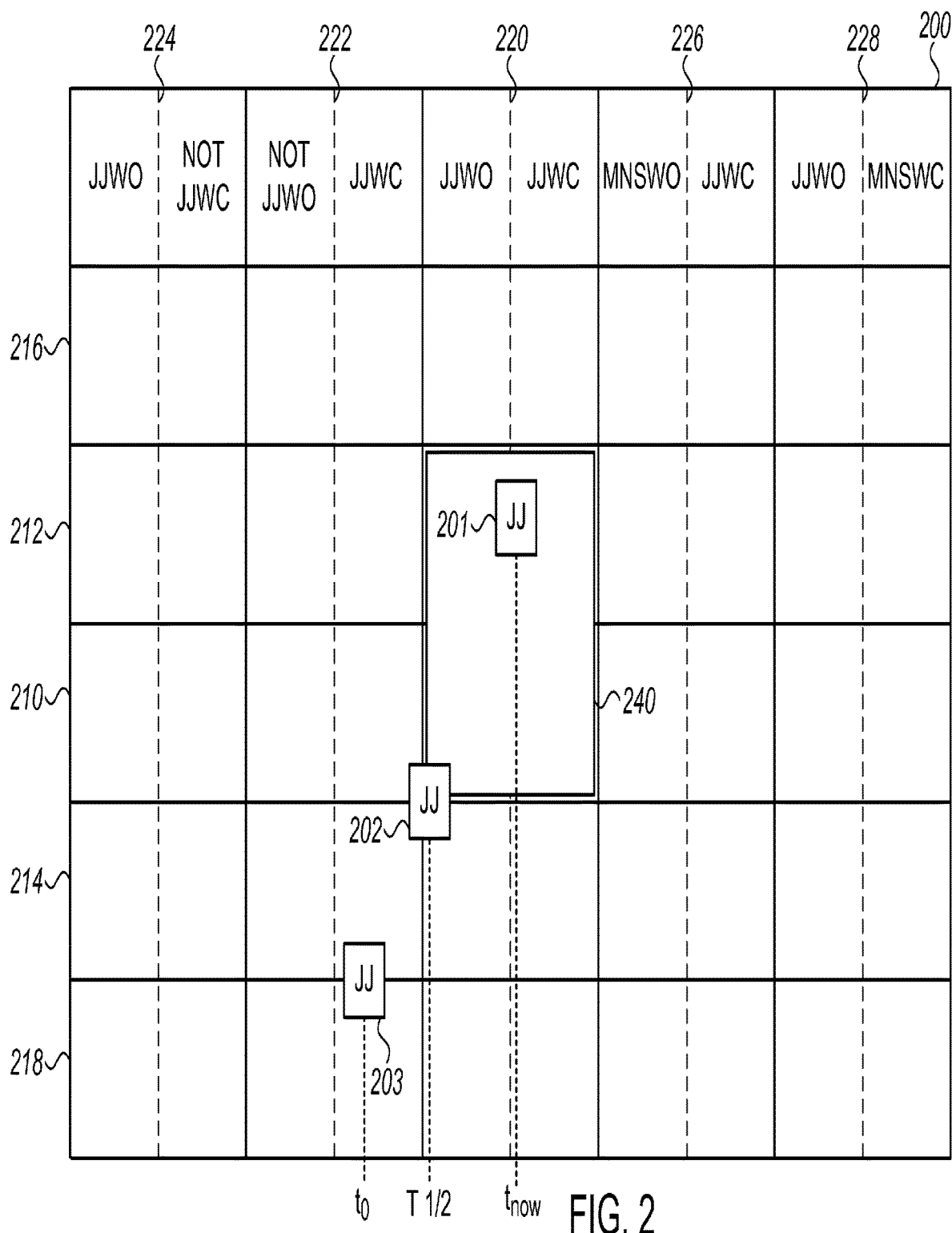
FIG. 2 is a schematic view of an MNS Graphical Link Organizer embodiment for an exemplary user.

According to how well MNS knows and understands JJ, MNS can now help JJ improve the self-study experience; by giving JJ a self-study navigator interface. Turning to FIG. 2, for JJ's current search & surf query, an MNS GLO chart (200) may be graphically manifest as a pop-up on JJ's large screen device or may be substantially manifest as JJ's entire screen; such as when JJ is using a smaller screen device—be it hand held, wrist worn, smart-spectacles embedded, or the like. There are at least two views of this MNS GLO chart; a GLO low resolution overview and a GLO higher resolution user navigating fish-eye overlay view.

The GLO low resolution overview, to a casual observer, looks like a map with some vertical and horizontal row-column quadrant defining reference lines; and scattered across the map are clusters of symbols (and/or dots or pixels or glyphs or letters or icons or thumbnail-pictures or the like) of various sizes, of which some may be color coded and others may be flashing (or twinkling). This is a chart-like overview organization of needs matching answers and solutions to an exemplary JJ-query (or a JJ needs description—including at least one JJ-provided needs-appropriate wellbeing criteria). Part of an overview chart is user organized and part of the chart is MNS organized (for the user, or for all users as a default) The user has a dynamic assignable map legend that lets the user define categories of answers and solutions; and to assign colors, flashing frequency, symbols, or the like to instantiations of these categories. Likewise, MNS has some predefined map legend assignments too.

Returning to the organization of the overview chart of symbols representing respective JJ answers and solutions, row (210) includes those at JJ's current reading level, row (212) includes those at about a grade above JJ's current reading level, row (214) includes those at about a grade below JJ's current reading level, row (216) includes those explained for JJ's real or potential teacher—who is more than about a grade above JJ in reading level, and row (218) includes those explained for JJ's real or potential student—who is more than abut a grade below JJ's reading level. If the nature of the answers and solutions relate to formulas and/or mathematical reasoning, then rows may be used for respective mathematics level rather than respective reading level. Likewise, for answers and solutions involving both, reading and mathematics levels are Boolean convolved and assigned to rows; to emulate equivalent JJ respective levels.

Now, the organization of the overview chart columns, for each respective query or needs description, is column (220) for results substantially compliant with JJ's wellbeing orientation and with JJ's wellbeing criteria, column (222) for results substantially compliant with JJ's wellbeing criteria but substantially lacking compliance with JJ's wellbeing orientation, column (224) for results substantially compliant with JJ's wellbeing orientation but substantially lacking compliance with JJ' criteria, column (226) for results substantially compliant with JJ's wellbeing criteria and with MNS's wellbeing orientation, and column (228) for results substantially compliant with JJ's wellbeing orientation and with MNS's wellbeing criteria.

Turning to one aspect of symbol representations and assignments, the user (JJ) may elect fast flashing red for occurrences best matching with wellbeing orientation and with wellbeing criteria; which probably occur in column 220, but may also redundantly occur in column 226 or column 228. Similarly, MNS may elect fast flashing blue for occurrences best matching MNS's recommended wellbeing orientation for JJ and MNS's wellbeing criteria for JJ's needs description; which probably occur in column 226 or column 228, but may redundantly occur anywhere. Now, even without telescoping into any of the results represented by the symbols on the chart, JJ already knows about instant wellbeing risk and instant wellbeing maturity from the distances between the cluster of flashing red symbols and the cluster of flashing blue symbols on the current answers and solutions chart. If these distances are large, then JJ would be wise to consider using an MNS social networking appurtenance to obtain consultation, counseling, consensus, or tutoring regarding his current orientation and criteria for this needs description.

Turning to another aspect of symbol representations and assignments, even without enabling any communications with members of the MNS social networking community, by indicating a measure of the MNS user population for each row-column quadrant, the user instantly understands how regular or irregular his configuration of wellbeing metrics and needs is; and how many or few teachers, colleagues, or students there might be for him on this topic. A user with a larger vision of wellbeing will probably perceive an abundance of potential students and a scarcity of potential teachers as public service opportunity; and the like.

Now, another iconic feature of the overview chart are a plurality of time stamped icons, the overview chart location of which portrays the user's wellbeing maturation. For example, icon-frame (203) represents JJ's reading level and respective wellbeing orientation and extrapolated wellbeing criteria when JJ first started using MNS; icon-frame (201) is at the center of both rows and columns because it represents JJ's current reading level and wellbeing orientation and wellbeing criteria; and icon-frame (202) is located according to who JJ was at about half way between the MNS user starting and now—and because wellbeing development is sometimes a discontinuous journey, there is no reason to automatically expect icon-frame (202) to be located on an imaginary line between icon-frame (203) and icon-frame (201).

Turning now from the GLO low resolution overview chart to the GLO higher resolution user navigating fish-eye overlay view, a default "discover the next layer of detail" frame (240) is the central row-column quadrant (user's reading level (210) intersecting with user's wellbeing orientation and wellbeing criteria (220)). By clicking or overpowering that row-column designation, the user's screen shifts to a respective listing of answers, solutions, summaries, thumbnail graphics, and preferably appropriate social networking opportunities; with known social networking associates and with new (potentially enabled for this specific needs purpose and respective relationship) associates. Alternately, the MNS user may shift the "discover the next layer of detail" frame to another row-column quadrant; and enabled to next layer of detail there (Mutatis Mutandis). According to other variations of this MNS fish-eye overlay, the row-column quadrant may be subdivided (such as by quad-tree, decimal gradations, or the like), magnified, and enabled to next layer of detail there (Mutatis Mutandis). By another MNS variation, the "next layer of detail" may be organized into a another chart-like representation according to dominant variables therein; which may be user and/or MNS elected. For example, if the layer of detail is dominated by links to audio-visual presentations, then these may be two-dimensionally sorted according to duration of presentation juxtaposed with original date of presentation; or the like.

Predetermined formats for alerts and/or alarms may be used with any of the aforesaid graphical navigator aspects and/or MNS GLO charts; for any of the symbols, clusters of symbols, row-column quadrants, or the like. For example, links to materials that might warrant parental approval might be covered with a flashing black alert overlay; and/or investigation detail that might be antithetical to the user's mental health might enable an appropriate audio message; or the like. Another discussion of alerts and alarms will be seen in a forthcoming neural network related MNS embodiment.

In summary, using such an MNS organized navigator interface and respective MNS GLO charts, JJ can optimize his "self education" searching and surfing experience by easily finding materials, falsifiable alternatives to the material, and respectively appropriate teachers, colleagues (virtual classmates), and students. Most importantly, by giving trustworthy consideration to JJ's perspective, MNS embodiments are integrated together, so that (A) JJ's wellbeing awareness most-likely becomes part of JJ's everyday consciousness, and (B) JJ's social networking experiences begin to match JJ's needs.

Now, here are a few terms, that are used to describe MNS embodiments, and some details that will help in appreciating their relevancy within MNS embodiments.

In the MNS context, a "projection" is one or more locations of information in at least one knowledge-base (database); which are the result of one or more searchings of those knowledge-bases; and/or compilations or summaries thereof, and/or to their respective locations. Thus, a projection will often relate to a location of a data base and to a location of data therein; locations being typically electronic addressing protocol formatted labels.

In the MNS context, "wellbeing orientation" and "wellbeing criteria" are related with respect to an exemplary user. A "wellbeing orientation" is a collection of subjective descriptions and objective quantifications which characterize the user's attitude and/or preferences toward the user's own wellbeing (or a subset of his wellbeing); such as to what age the user wants to live healthy and what he is willing to do for this purpose, his preferences and priorities, how much weight (importance) the user is giving to his short term health in comparison with his long term health, does he prefer to take risk if this may bring better results, what are the important values of the user, (such as how much time and effort the user would like to devote to improving his health—such as by changes in the user's diet, emotional state, physical activity, social life, etc.), and other aspects characterizing his beliefs and values. A "wellbeing orientation" can be also a set or a subset of "wellbeing orientation" for specific types of needs or solutions, or a collections (super-set) of "wellbeing orientation" for many areas. An exemplary subset of a user's "wellbeing orientation" can be his preferences and weights for attributes of a need or a solution—for example: When choosing a restaurant—what weights he will give to: the price, the atmosphere, the service, the taste, how healthy the food is FOR him (e.g. organic, fresh, vegan, glutton free), specific dietary requirements, cuisine type (Italian), distance, waiting time, his intuition of feeling about the place etc.

A "wellbeing criteria" is a collection of subjective descriptions and objective quantifications relating to a user's "needs description" (described, per se, in a near-subsequent the next paragraph—below); such as, for a user need "social life"—a criteria to increase or to decrease; or for a user need "body-weight"—a criteria to-gain or to-lose. A wellbeing criteria can be presented as a vector or list of preferences or priorities or weights for the attributes or subsets of a need.

For example a wellbeing criteria for choosing an holiday for Mr. JS can be: the following weighted priorities (, when +10 represent very important, 0 don't mind, and −10 don't want): to stay in a 5—starts hotels+9; to have opportunity to meet girls+10; to enjoy dancing+9; to meet people from other countries and/or cultures −0; to be most of the time in nature+2; to have free and quite time for himself 0; to climb on mountains −10; to ski −10; to swim+2; camping −9; to drink good wine+8; how much money he is willing to spend on the holiday? $5000; and the like (to give a quantification of relative importance to the user's criteria). etc While for another user, Mr. MB, his priorities for a holiday are: 5-star hotel 0; he prefers to go on holiday with his girlfriend camping+9; to be in nature+10; dancing+1; to be in a retreat with people doing yoga and meditation+10; to meet people from other countries and/or culture+8; to swim+7; drink wine 0; how much money willing to spend on holiday $800; and the like.

Another criteria importance quantifying example relates to—diet wherein: Ms. BR preferences/weights for diet: healthy food+10; sweets −5; organic fruits and vegetables+ 10; fresh fruits and vegetables but not organic+8; nuts+8; bread with gluten −10 (she prefers gluten free); meat −10 (not at all); Trans fat −10; foods contain omega 3 such as flax seeds+9; food contain high level of sugar; −9; processed food −9; raow food+9; water (she—prefers Mineral water): 10; filtered water 8; tap water 1; etc. Ms. CB priorities are; healthy food+5; sweets +10; organic fruits and vegetables+ 1; fresh fruits and veg but not organic+1; nuts+0; bread with gluten+8 (she loves bread); meat+9 Trans fat (margarine) +5; food contain omega 30; food contain high level of sugar;+8; processed food+9; row food 0; water—(she will not pay extra for Mineral water): 1; filtered water 1; tap water 1; and the like. etc BR prefers to eat in a quite restaurant while CB prefers a restaurant with music and many people; BR likes Chinese, Italian, Indian and vegan restaurants while CB likes French and fast foods restaurants. If BR or CB are searching for a restaurant in their area, the ordinary prior art search engine is blind to their preferences criteria.

Simply stated, for the ordinary dumb search engine of today, a collection of search terms are typically questioner wellbeing criteria blind; and also essentially assessing the search terms as if they are spontaneously arising (such as without connection to the user's specific wellbeing orientation or criteria). Particularly, for the ordinary dumb search engine of today, the questioner's wellbeing orientation is typically replaced by the commercial orientation of search engine sponsors, advertisers, and the like; which is, more often than not, worse than user wellbeing orientation blind.

In the MNS context, a "needs description" may be transformed (and further recursively transformed and/or substituted) into a respective wellbeing criteria weighted plurality of substantially equivalent aspects; which conform to a users preferences (his consideration of relative importance of aspects and attributes) and are most preferably substantially in conjunction with a wellbeing orientation. These aspects may be selected from the group consisting of: attributes, tags, synonyms, replacements, substitutions, decompositions, transformations, proximate word clusters occurring in a knowledge-base, key words, markup language codes, free form text, and the like. For example, a needs description related to improving the user's health, that is expressed in generic layman terms, maybe expanded into a broad cloud of related meanings, which include aspects of diet balance, emotional state, physical activity, and a time line of urgency (which may be anything from "only looking for a quick remedy" to "wanting to change lifestyle and improve wellbeing to best avoid any health problems like the one described").

There may be subtle or overt conflicts between a user's wellbeing orientation and a specific instance of that users own wellbeing criteria. For example, the user's orientation may indicate a desired body-weight of from 60 to 70 KG (or some narrow category of BMI—Body Mass Index—a first order parametric calculation suggesting healthy body-weight according to age, gender, and height) while this user may express a need to reduce body-weight, even though this user is already under his orientation expressed body-weight. MNS does not assume that mutually conflicting orientation and criteria represent some kind of validation error; even though that is also a considered possibility. MNS expects that there are such conflicts and that these respectively suggest investigation into other aspects of the user's wellbeing; and that some of these are in fact not personal to the user's implementation needs, but simply part of the user's healthy need-to-know curiosity. Thus, returning to the body-weight conflict case, the user may thereby alternatively be expressing a need to examine other aspects of his wellbeing; since a body-weight orientation with a conflicting body-weight need may be an expression of emotional, psychological, or spiritual issues. There can be a conflict between the user's logical long term wellbeing orientation and his short term desire to enjoy; or between his logical thinking and his emotions or desires. Simply stated, wellbeing represents a paradigm that is capable of being more holistic than the individual's instant "needs description" instantiations. The MNS embodiments may present the user with the conflict between his short term desire and his long term wellbeing orientation; and even advice him about how to resolve this conflict for his own benefit. Nevertheless, the preferred MNS embodiments, but it always empower the user to make the informed choice as he prefers. The MNS can include interactive tutorials to train the users to improve the process that whereby he they makes decisions or choices; to improve his total life wellbeing.

For example, many people have habits that they enjoy but that are not good for their wellbeing (such as smoking, eating too much sugar). The MNS can help the users to improve their habits that they enjoy more what is good for their wellbeing; and help them to learn to choose products, services and habits which will improve their wellbeing, so that at the same time they will enjoy better healthy meaningful lives.

In the MNS context, a user "input format" may be selected from the group consisting of: a journal entry by the user, a diary entry by the user, a memo by the user, a statement by the user, a private statement by the user, a shared comment by the user, a publicly expressed statement by the user, the user's needs description, a record of the user navigation from the needs description to portions of user-respective weighted and filtered projection, specific questionnaires, interactive protocols that can include choosing photos, symbols, and any type of input. Likewise, a user "input format" may be a user response to a structured survey or questionnaire; such as user response to: a multiple choice test; a rate or grade from good to bad, or from high to low, or from one to ten, etc.; a one word or few word answer question; or the like. The interface can be pictures or symbols instead of, or in addition to, words. These input formats are firstly used to help MNS to know the user and to respectively understand the user; and secondly used characterize the user according to predetermined standardized wellbeing metrics, and according to more personalized respective user's frame-of-reference wellbeing perspectives, assessments, and aspirations. MNS relates to these input formats from both a Piaget-like perspective and a Vygotsky-like perspective; as will be described in greater detail (in the "Description of Embodiments—Detailed Discussion" section).

More specifically, to help span the distance between standardized and user-crafted wellbeing characterizations, MNS input formats may typically be anything from (A) Piaget-like structured quantifications and scale oriented subjective grades, to (B) Vygotsky-like user descriptive narratives and ramblings; both of which were invented to explore metrics of development psychology. In the MNS wellbeing context, Piaget-like methods are typically suitable for comparing the user to data compilations; while Vygotsky-like methods are typically suitable for transforming MNS into the user's frame of reference. Accordingly, the vertical dimension of the exemplary JJ self-study navigator interface is substantially Piaget-like and the horizontal dimension is substantially Vygotsky-like.

Regarding MNS's collecting, knowing, and understanding developmental-state subjective data and respective wellbeing-state actuality for users, MNS applies Jean Piaget's methodology, relating to quantitatively testing subjects (regarding a predetermined developmental-state hypothesis), and Lev Vygotsky's methodology, relating to evoking spontaneous free-form statements from test subjects (regarding their developmental-state concepts). In MNS use, Piaget represents embodiments of structured pre-organized researcher-generated hypothesis testing questionnaires and statistical analysis thereof (such as literacy levels), while Vygotsky represents embodiments of unstructured interview questioning to collect and organize test-subject-generated perspectives (such as cognitive dissonance). Historically, by these substantially different techniques, Piaget crafted an external "theory of cognitive development" according to a generalized "genetic epistemology", while Vygotsky (for the same topics) crafted internal variations for an "emergence of the reasoning" which collectively generalized into "zone of proximal development" ontologies. With the MNS users, the preferred MNS embodiments resort to both Piaget-like interactions (for objectified consideration of externally narrated wellbeing attribute perspectives) and Vygotsky-like interactions (for subjective consideration of internally narrated wellbeing attribute perspectives).

The user will be able to view his Wellbeing Orientation and his Wellbeing Criteria; and to edit them. Of course, this will also be encouraged; both because the user is maturing and because the user is developing a relationship of trust with his interactions with MNS.

In the MNS context, a "wellbeing currency" may be selected from the group consisting of: goods, services, a valuation for goods or services, points, credits, rewards, acknowledgments, vouchers, coupons, financial instruments, real monetary units, abstract monetary units, virtual symbols, and the like.

In the MNS context, a "caste" of users (having understanding of a weighted and filtered projection onto a knowledge-base) may be spontaneously assembled from a large plurality of MNS users (i) by virtue of these users having expertise in results found in that projection, (ii) by virtue of these users having experienced or generated a similar MNS projection, (iii) by virtue of these users having previously expressed curiosity about a substantially similar projection, (iv) by virtue of these users having similar wellbeing orientation to a user who has initiated this projection (in search of matching an answer to his needs), (v) by virtue of these users having similar wellbeing criteria to that user, (vi) by virtue of these users having something in common (e.g. age group, ethnicity, education, city), (vii) by virtue of combinations of these virtues, and (vii) the like. A caste, or part of a caste, may be more ICT amenable to chat-room, forum, or web-event communications than to direct user-to-user communications. Accordingly, caste members may be presented with an ongoing schedule-sorted list of MNS invitations, while MNS facilitated user-to-user introductions may be presented as a different list; which may be topic and time organized and requesting-party level and wellbeing orientation annotated. These lists also may form the domain of links for a Graphic Link Organizer ("GLO") embodiment; such as are exemplary described with FIG. 2, and are likewise further described in the "Description of Embodiments—Detailed Discussion" section (below).

In the MNS context, a "life quality metric" may be selected from the group consisting of: a current standard MNS wellbeing quantification; a current predetermined wellbeing quantification performed at arms-length according to any individual or combination of academic, commercial, NGO, or governmental wellbeing standards (such as those describe above in the discussion of "Wellbeing: A broadly accepted term-of-the-art . . . "); a different predetermined version of any of the aforesaid quantifications; a subjective characterization of any of the aforesaid quantifications; and the like.

Concerning a current MNS wellbeing quantification, a number of factors are preferably considered. In all instances, the first criteria of these is life, wherein a best practices medical triage appraisal is attempted to classify the life quality situation; as anything ranging from instant life threatening critical, through interim acceptable lifestyle variability, to long term actuarial life expectancy relevant. Thereafter, MNS user profile complementarity assessment factors are explored. One example of such an MNS exploration might be "How would the user's needs matching potential be improved if the user were to be provided with anything from an opportunity to receive charity or an opportunity to give charity (either being in any form of goods, services, or currency as herein described)?". Another example of such an MNS exploration might be "How might the user have better access to understanding available knowledge if the user had access to language translations services (human or automatic) between the user's language and (A) a language of a user relevant knowledge-base finding, or (B) a language of a social network "helper" familiar with a user relevant knowledge-base finding?". The ontology of MNS exploration returns (i) to the prior art discussions (in the Background Art section—above) for human centric data systems, (ii) to the MNS context "needs description" (above), and (iii) even to the discussion on the "Further MNS Application Examples" sub-section (below).

Simply stated, regarding ICT representations used to appreciate embodiments, an MNS life quality metric may be expressed as a vector in an abstract multi-parametric dimensionality wellbeing space; which in turn may be used to pre-orient projections onto knowledge-bases when searching to match needs to respective answers, solutions, appropriate castes, and the like. Furthermore, there are classes of problems and situations where the quantification is a multi-parametric collection of scalars and/or a multi-dimensional vector; and "the" quantification is an abstraction or transformation of that; according to an assigned wellbeing perspective or wellbeing paradigm (such as reference in the "life quality metric" discussion—above); and likewise for a plurality of quantifications (Mutatis Mutandis).

Life Quality Metric can cover all aspects of the user life's attributes (global Life Quality Metric), or can be a subset of it related only to a specific aspects of the user's life. Example of a global Life Quality Metric: if w(i) is the weight or the relative importance that a user is giving to each specific areas of his life (such as: family life, carrier-work, learning-education, social life, financial, health, community, spiritual, leisure, security, environment, housing, transportation, communication, happiness etc); and SL(i) is the user's "satisfaction level" of these areas or his rating of the level of each attribute; then the level of the users Life Quality can be calculated, such as is done in the following example.

The level of the user Life Quality can be calculated as a sum of subjective weighting, multipliedy by respective rating (subjective or objective rate or satisfaction level) of the relevant attributes. Thus, for an exemplary: w1×family life rating: (SL1)+w2×carrier-work(SL2)+w3×learning (SL3)+w4×social-life (SL4)+w5×Financial(SL5)+w6× Health(SL6)+w7×community(SL7)+w8×spiritual(SL8)+ w9 ×leisure(SL96)+w10×environment(SL10)+w11×housing(*SL11)+w12×happiness(SL12); wherein the weight w can be a subjective relative important of each area (e.g. between 0 to 10) and SL can be a subjective rating value (e.g. between 0 to 100) for the level of the user's satisfaction of this area.

However Life Quality Metric can be a subset of the above for one specific area; such as health or housing. It can be even a subset of a specific area to cover very narrow subject.

Examples subset of health: dental health, or fitness, sleeping quality, satisfaction from the healthcare service or the family doctor.

For each of such subset area, we can have a Life Quality Metric relevant for this area.

For example for sleeping quality: w1×not tired during the day (SL1)+w2×(can sleep immediately when going to sleep) (SL2)+w3×(can sleep the number of hours that I want) (SL3)+w4(don't awake up during the night) (SL4)+w5× (enjoy my dreams) (SL5)+w6×(don't snore) (SL6)+w7× (happy with my bed) (SL7).

We can define Life Quality Metric for each area of our life, for each service, and for each product. For each life's area, or service, or product we can define its sub-areas or attributes. The Life Quality Metric for this life's area, service, or product can be a formula; and its simplest form is the sum of the weights of each attribute multiplied by the level of each attribute. However, it can be other types of calculations; which will map all the attributes (or sub "components/areas) into a quantity. Ideally, we prefer to create simple formula that the user is able to understand, and to compare to alternative solutions with minimum efforts, and also to enable to add and compare different area by some way of normalization into a similar dimension.

The user will be able to view and edit his Life Quality Metrics; and also to view Life Quality Metrics, which can be averaging of all the users or of a specific group of users. However his Life Quality Metrics data will not be disclosed to a $3^{rd}$ party without his specific permission. The anonymous data can be shared to help other users.

Returning to FIG. 1, this invention more specifically relates to embodiments of A Needs-Matching Navigator System ("MNS"), which is for improving at least one state (of a user (170) of a large plurality of users (180)), and the at least one state is selected from the group consisting of: social, economic, psychological, emotional, pleasure, spiritual, medical states, and like wellbeing states; and the system has four software driven modules.

The first software driven module (120) is residing on a device (110) selected from the group consisting of: (i) the respective user's device of a first plurality of electronic communications enabled users' devices, and (ii) at least one platform enabled with electronic communications to the respective user's device, to a plurality of other devices of this user, and to at least one electronically stored knowledge-base. For knowing who this user is, the first software driven module is interactively engaged with the user in creating, maintaining, and updating a profile (125) of the user. This profile has at least one characterization of the user's perspective; which is including at least one needs-appropriate wellbeing orientation (or wellbeing criteria) of the user, and at least one privacy preference of the user. Simply stated, the user is expressing (A) not just "who the user is" but "who the user might like to become", "what the user's preferences are" (with respect to his own wellbeing or any subset of it); and (B) what quality of privacy the user prefers for the information that the user provides to MNS and for the activities that the user may perform within the MNS context. Preferably, the user can always access his profile (that is the full profile as MNS views it), edit it, comment on it, update it, etc.

For understanding what the user is looking for, in electronic communications with the first software driven module, the second software driven module (130) is for accepting and understanding at least one needs description (135) of the (respective) user. This needs description is including at least one needs-appropriate wellbeing criteria (described above). Understanding the needs description includes convolving the needs description into a respective wellbeing criteria weighted plurality of substantially equivalent aspects. Simply stated, convolving, in this MNS context, relates to combinations and permutations of subsets of the needs description transformations (described above) which may be used (by the third software driven module) to try to find complete, partial, complementary, or reasonably user significant related answers to the user needs description and to questions, problems, and/or issues described therein. User significant related, at this stage, means where any of user needs "description", need specific user "wellbeing criteria", and/or general profile user "wellbeing orientation" have complete or partial overlap. Secondary interactions and assurances may be requested of the user, for instances where wellbeing orientation conflicts with wellbeing criteria; however in the absence of affirmative user resolution, it would be presumed that the need specific wellbeing criteria is more hypothetical, and the general profile wellbeing orientation is more actual (, however the user has the choice, if the wellbeing criteria is more relevant to him).

For finding at least one such answer to the needs description, in electronic communications with the second software driven module, the third software driven module (140) performs steps (141, 142, 143, 144) of (i) projecting the understood at least one needs description onto the at least one electronically stored knowledge-base (190), (ii) filtering the projections using the user profile, and (iii) strongly weighting the filtered projection using the at least one characterization of the user's perspective. Generally, the projecting is in keeping with the operations of search engines and meta-search engines, albeit operating with a combination of key words; some of which represent the needs description and others of which represent the needs related wellbeing criteria. More specifically, where practical, the projecting is onto knowledge-bases having respective descriptors and ontologies (specifications) appropriate for the needs description. Furthermore, an exemplary filtering may be according to the users' geographic location, budget, language comprehension, or the like. The phrase "strongly weighting" recognizes that however altruistic and pristine the intentions of the best MNS embodiments may be, there may be those who try to convolve the users wellbeing with the "wellbeing" of advertisers, sponsors, etc. To the degree that the user's wellbeing remains dominant within the filtered results, this is an embodiment of MNS; albeit when the filtered results degrade the status of the user's wellbeing to secondary, this is not an embodiment of MNS. A facile test for evaluating the complimentarity and overlap of the user wellbeing with those of advertisers/sponsors is to compare then using one of the life quality metrics (described above).

For matching the user with access to portions of the weighted and filtered projection (onto the at least one electronically stored knowledge-base), in electronic communications with the third software driven module, the fourth software driven module (150) "gives" the user some of these good answers and/or solutions (155) to the user's needs description. Specifically, this fourth software driven module provides electronic communications links to these knowledge-base sub-addresses, summaries of content thereat, mirror images of content thereat, or the like; so that the user may improve his wellbeing, and progress according to his needs. Preferably, this access is available for the user to explore in an arrangement according to life quality metrics; which may at least have the benefit of familiarizing the user with parameters and variables of life quality metrics.

Concerning a communications topology (111) operable for these four software modules, it should be appreciated that the linkage of each module instantiation, with a respective next module instantiation, may be direct, indirect via any other device or platform where these modules reside, or via a device or platform (such as a server) where none of these modules reside. According to another variation of the topology, more than one of these module instantiations may reside on a single device or platform. Between the larger plurality of user devices, electronic communications may include direct peer-to-peer (P2P) Wi-Fi, propagated autonomous P2P Wi-Fi, circuitous server propagating Internet, combinations thereof, and any other wired or wireless communication, and the like. (Wi-Fi: Local area wireless technology that allows electronic devices (i) to exchange data and/or (ii) connect to the Internet.)

An MNS Social Network: According to a first instance embodiment of MNS, the fourth software driven module includes performing four steps (160); which inherently scale into a social network when they are performed by many users of the large plurality of users. The first step is creating an instant community for the respective user by inverse projecting (165) large subsets (of that user's weighted and filtered projection) back onto the large plurality of users according to this respective users' profiles and needs descriptions. This is how MNS comes to know which members of the MNS community may have a common interest with this user; that common interest being best defined as this user exploration and elected accessing of life quality metric organized results of the four part MNS embodiment (described above). The second step (166) is then filtering any users out of the instant community using this respective user's profile, wellbeing orientation, and privacy preference. This filtering leaves kindred type users, such as those not only expressing exemplary interest in body-weight, but likewise oriented to losing rather than gaining body-weight; or the like. The third step is then sorting suggestions for potential bilateral and multilateral communications between the respective user and the filtered community; which is preferably accomplished by pair-wise thresholding (i) comparisons of profile, (ii) wellbeing orientation, and (iii) needs-appropriate wellbeing criteria. This sorting organizes the community according to similarity with the user (regarding this need); albeit without skewing the results by cast aspects. Of course, for the user, the fourth of these steps is then providing (167) access for these communications to the respective user and to at least one other user according to the sorted suggestions. In a bigger picture, the unfolding of many bilateral and multilateral communications (according to this first instance embodiment) results in a social network (169) having links initially formed according to mutuality of interest, purpose, and the like.

Now, according to a first variation of this first instance embodiment of MNS, sorting by the fourth software driven module include performing two steps; which preferably provide some intelligent intuitive structure to the user's appreciation of choices (he may have) to build and to expand his social network. The first step is classifying the filtered community into castes of users (having understanding of the weighted and filtered projection) according to at least one virtue (as described above); presented as a user-centric graphic navigation "menu" (like a polar coordinate clock face), various clusters of links to caste similar users appear at various angles to the center. For example, mentors who can teach and explain the answer or solutions to the needs description may appear above, while students and curious lay-individuals may appear below; and the graphic interface preferably allows the user to drill down into the relevant public profile aspects of these potential social networking collaborators. The second step is presenting electronic communications navigator options (such as messaging, invitations, chat, mutual interest group formation, and the like) to the respective user for networking the respective user into at least one of these castes; where in the caste is best represented by a member that the user has chosen, albeit may be already represented by a pre-existing group moderator, or the like.

Likewise according to aof second variation of this first instance embodiment of MNS, providing access by the fourth software driven module includes a step of presenting at least one statistic for a Boolean intersection representation of a mutual metric selected from the list: profile, wellbeing orientation, and needs-appropriate wellbeing criteria. Simply stated, in addition to caste sorting or independent of cast sorting, the user may be presented with a view or representation of needs description reflective community according to their respective commonality of life quality metric (as described above).

Having brought the user into a perspective dominated by consideration for wellbeing and life quality, there are numerous permutations and combinations of features which may provide added value and added insight to the user MNS experience. Thus, according to a second instance embodiment of MNS, providing access by the fourth software driven module includes at least one software application for the respective user's device which is interactive with a module of the four modules, and the application has at least one pair of functions. What every one of these pairs of functions have in common is that they can motivate the user to explore and consider ideas to improve his wellbeing, and these ideas may be beyond the user's current self-centric limitations (his orientation, criteria, time considerations, and the like). Simply stated, here are enhancements that may help the user for maturely thinking about choices; which apparently the user believes are out of his box or is not aware about them.

A first of the pair of functions is selected from the group consisting of: (i) sending feedback (structured or free-form; MNS requested or user spontaneously generated; and the like); (ii) suggesting enhancing at least one wellbeing metric, wellbeing orientation, or wellbeing criteria; (iii) interrogating potential life quality by trying alternative weight and filter combinations of the portions of the projection (of the understood at least one needs description onto the at least one electronically stored knowledge-base); and the like. In this context, life quality may include both the life quality as an "MNS context term" (as described above) and wellbeing orientation (conflicting or not) with wellbeing criteria scenarios (likewise as described above).

A second of the pair of functions is selected from the group consisting of: (i) receiving notice of credit for a fungible currency unit for wellbeing exchange; (ii) receiving a personal-decision summary view of potential shorter-range resultant changes in a wellbeing metric for an aggregate of needs; (iii) receiving a life-strategy assistant summary view of potential longer-range resultant changes in a wellbeing metric for an aggregate of needs; and the like. In this context, motivation for the user to enhance his own wellbeing may be achieved by any combination of (A) awarding the user real, abstract, or symbolic value for his wellbeing accomplishment; and (B) presenting the user with ideas, concepts, and even narrow life-choice suggestions for him to consider as ways that the user can empower an improvement to his own wellbeing.

Now, preferred MNS embodiments allow the user ongoing opportunity to go back to edit and/or modify and/or alter his profile, weightings, preferences, and the like. Thus, according to a third instance embodiment of MNS, maintaining a profile by the first software driven module includes accepting user input (such as describe in the MNS context "user input format" above). Simply stated, to the best degree feasible, the user should always be able to update his profile and his wellbeing orientation therewith. This does not mean that MNS must forget the user's wellbeing orientation history. Furthermore, according to a fourth instance embodiment of MNS, maintaining a profile by the first software driven module includes: (A) expanding the user profile by transforming the user profile into a needs description to further define the user according to electronically stored knowledge-bases; and (B) allowing the user to examine the expanded profile derived from a projection therefrom. Thus, another aspect of accepting user input relates to letting the user explore what MNS may understand about the user; which includes references and content describing the user that MNS may have found when expressing the user as a search term for projection onto various knowledge-bases.

Simply stated, just like most users try out new search engines by asking that search engine to search on the user's name, likewise MNS independently builds an aspect of the user's profile from details gleaned by searching about the user. Of course these findings are not an expression of the user's wellbeing orientation, but they may represent aspects of external perceptions of that orientation. Part of the user input to MNS may include confirmation, validation, correction, or denial of these external knowledge-base derived user profile findings. In compliance with many jurisdictions, the user may empower MNS to protest such user specific items; such as directly to the respective knowledge-base and/or to respectively responsible data privacy regulatory agencies. Recursively, in instances where a user is plagued by public or private knowledge-base identity conflicts, the user may empower MNS to diligently monitor changes in knowledge-base responses to query about the user's profile aspects, identity components, name, profession, residence, and the like.

Likewise, the user's maintained profile may include products or services that the user bought or used, information related to the user from other third party sources (such as medical records and information from health experts, consultants, coaches, friends, family or, tutor), and input information from sensors (such as from personal accelerometers which monitor movement, information from cameras, video cameras, microphone, body sensors of heart rate, respiration rate, temperature, eye movement, etc.).

Further preferred MNS embodiments allow the user ongoing opportunity to explore changes of direction for his own wellbeing; extending from short term changes to distant shifts of milestones and goals. Thus, according a fifth instance embodiment of MNS, maintaining a profile by the first software driven module includes accepting at least one hypothetical wellbeing orientation; through which the user can see hypothetical consequences of possible changes to his wellbeing orientation, and thereby may help the user appreciate how to better his own wellbeing. For example, a youthful user currently giving a wellbeing orientation of life expectancy goal of 60 years may experiment to see how MNS would respond to his needs if his was the actuarial average life expectancy for his profile particulars (perhaps 80 years); or to see how MNS would respond to his needs if his wellbeing life goal life expectancy was set to an optimistic 120 years. By another example, the user could appreciate existing biases by exploring what the MNS consequences would be if the user had a different gender, a different age, a different race, a different present location of residence, of if the user knows another language, or the like. Likewise, according a sixth instance embodiment of MNS, accepting and understanding at least one needs description of the respective user by the second software driven module includes simulating at least one hypothetical wellbeing criteria; through which the user can begin to appreciate how altering his present user needs wellbeing criteria could create a different MNS projection universe-of-choice for him in dealing with, answering, progressing, and/or solving that need.

While the user exploring hypothetical wellbeing orientations and hypothetical wellbeing criteria encourages the user to consider new and different life directed alternative, there are always models of wellbeing (that are outside the user's curiosity) which may provide even better life directed alternative. Thus, according a seventh instance embodiment of MNS, convolving by the second software driven module includes: (A) simulating using combinations of iterative perturbations about the at least one wellbeing orientation and about the at least one needs-appropriate wellbeing criteria; (B) evaluating the simulation resultant weighted and filtered projections using a life quality metric; (C) extracting the projections having a life quality metric that is equal to or greater than a respective life quality metric for a combination of the user's wellbeing orientation and wellbeing criteria; (D) sorting the extraction according to respective future flourishing life longevity horizon distance; (E) presenting the user with access (i) to statistics describing the sorted extraction (such as some specific "small change" could give you a longer life!) and (ii) to any user selected instantiation of an extracted projection; and (F) any of a vast assortment of mathematics and/or heuristics suggested alternatives consistent with any of the aforesaid steps (A-E). Preferably, MNS is using valuable processing time (available between real-time users' requests and transactions) to substantially "contemplate" the user as a complete representation including the user's (i) profile, orientation, and history thereof; (ii) the entire collection of his needs, criteria, and his respective decisions thereto; and (iii) the like. Likewise, according an eighth instance embodiment of MNS, weighting the filtered projection by the third software driven module includes: (A) trying hypothetical substantially proximate (realistically user possible) perturbations of the characterization; (B) searching therewith for at least one respective knowledge-base projected instantiation having a better life quality metric wellbeing quantification than the knowledge-base portions derived according to the at least one wellbeing orientation and the at least one needs-appropriate wellbeing criteria; and (C) presenting the user with access (i) to statistics describing and comparing respective future flourishing life longevity horizon distances for (i) the at least one respective better life quality metric knowledge-base projected instantiation and (ii) any user selected instantiation of an extracted projection.

Returning to the issues of communications topology for these four software modules (described above), according a ninth instance embodiment of MNS, the respective user's device of a first plurality of electronic communications enabled users' devices is a mobile device. Given the ongoing convergence of mobile device functionality, the mobile device of the present invention may be a smart-phone or a smart-watch; and/or it may be any data communications empowered personal device for accepting or conveying audio, visual, and/or tactile information; and/or it may be a personal physiological feedback device, which may be relate to physiology parameters' monitoring and/or feedback and/or proactive medical and/or pharmacological intervention; and/or physical and/or data-communications empowered combinations thereof. Furthermore, given the peculiar mobile device architecture divergence between a tendency on one hand to empower mobile devices with ever-increasing resident processing capacity and a tendency on the other hand to minimalism resident processing in conjunction with the ever expanding data cloud-computing (shared "permission to access" resources) universe of seemingly infinite data and infinite data processing resources, a mobile device may be a real physical device that travels with the user or it may be a virtual device that is associated with the user's real-time location. According to a variation of this ninth instance embodiment of MNS, a pointer to a significant portion of the respective user relevant knowledge base of the at least one electronically stored knowledge-bases is stored on the mobile device in conjunction with associated electronic data storage in a data storage cloud.

Alternately stated, just as the SETI@home coordination of computing resources for a very large plurality of users resulted in a heretofore unbelievably huge computational capacity, likewise MNS is scalable to a very large plurality of users; having a collective resources capacity. To wit, the MNS user community of devices, computing resources, and data storage resources are capable of enabling respective user acceptable quality-of-privacy threshold protocols through which both computation capacity and user profile data may be coordinated. For example, the old fashion shout-in-a-public-place "Is there a Doctor in the house?" may be replaced in MNS by "Which user of the large plurality of MNS users (A) is a Doctor-AND-(B) is within a reasonably near distance to the MNS user (who has this instant emergency medical need)?"; or replacing the old fashion market survey with an MNS user profile survey such as "What is the average school day wake up time for MNS users of High School age who are located within a reasonable survey distance to the MNS user?"; or the like. These too are MNS expressions of user "needs description"; both being exemplary of "reaching into" profile data that may be distributed in the respective user devices and potentially never uploaded into an MNS centralized knowledge-base. Thus, for a large plurality of MNS user devices, embodiments of privacy assurance protocols are preferably enabled to allow sharing computational resources and sharing of knowledge resources. Furthermore, if the devices are enabled in autonomous or direct P2P Wi-Fi modes, then many of the ongoing continuations of searching for hypothetical wellbeing orientation and/or criteria "needs description" answers/solutions and flourishing life longevity horizon improvements may be derived at a user device level, without necessarily calling on MNS severs, MNS cloud resources, or the like.

Returning to the issue of "user's profile", according a tenth instance embodiment of MNS, the creating, maintaining, and updating the user's profile by the first software driven module includes: (A) evaluating a change of the profile using a life quality metric; (B) normalizing any such change in the life quality metric quantification evaluation for the profile according to a most current of these at least one needs-appropriate wellbeing criteria; and (C) for an account of the respective user, crediting or debiting the account with the normalized metric of a wellbeing currency. MNS can consider to what degree the user is accomplishing his wellbeing orientation and to what degree this "accomplishment" is an improvement according to a life quality metric (as described above); and MNS may then praise or admonish the user accordingly. Because MNS has wellbeing centric bias, MNS users are members because they would like to take advantage of that bias, and receiving feedback and feed forward from MNS is a preferable user expectation. Simply stated, MNS acts like a friend and partner in the progress of each users improving wellbeing.

Now, according to one model of an economy of wellbeing currency, like events for different users are not equivalent. For example, two over-weight users are respectively encouraged to loose body-weight. However, the MNS reward for each losing one pound (or kilogram) would not be the same if one user would need to lose ten pounds (or kilograms) and the other user would need to lose 100 pounds (or kilograms). Similarly, completely different aspects of a users change of profile might be equated according to how the impact the user's life expectancy. For example, there might be an equivalent impact to the respective body-weight loss by the user meditating (or praying) a few minutes each day, or the user engaging in community service (anything from joining a community service organization to taking a few minutes each day to pick up litter in the public way). Accordingly, a life quality metric can be used to evaluate most any change in profile, the user's wellbeing criteria can be used to help normalizer the significance of that life quality evaluated change of profile, and a wellbeing currency may be used to motivate (by reward or penalty) the user accordingly.

Turning now to another issue of "user's profile", according an eleventh instance embodiment of MNS, the creating, maintaining, and updating the user's profile by the first software driven module includes: (A) applying a neural network to monitor dimensions of the profile for risk mitigation relevant changes to a life quality metric quantification of the user, and (B) transmitting to the user (i) at least one fast recognition representation of the life quality metric quantification, (ii) an alert in an event of a substantially diminishing flourishing life opportunity for the user, and (iii) an alarm in an event of a worst case scenario being discovered beyond the respective user's current future flourishing life longevity horizon. In this context, a neural network is a software driven optimization tool for solving (or approximating solutions to) a large number of differential equations; particularly for providing a plausible set of respective weightings for a large collection of functional relationships between various cliques of variables in a highly multi-parametric computation space. One (of numerous) peculiar aspects of neural network processing is that the order (history sequence) of inputs leads to different solutions; among the often many simultaneously viable solutions to a collection of differential equations. Accordingly in the MNS context, there are two typically quite different user relevant results that a neural network may provide; one, being the current result arrived at by adding the latest changes to the ongoing accumulations of sequential changes of user profile, orientation, and the like; and the other, being an instant new evaluation of all that is currently known about the user profile, orientation, and the like. The sequential accumulation is characteristic of ongoing relationships, while the new evaluation is characteristic of instant arms-length opinions by an independent expert, consultant, jury, or the like. There are also often search heuristics which engage a neural network using alternative profile orderings from the historical sequence, or which only use either extreme profile events or only use mundane profile states as inputs, or which use time-weighted averaging of the historical sequence; and the like. In the MNS context, independent of any MNS reward or penalty, it is of preferable significance to provide the user with an ongoing instant symbolic (or abstract) representation view of his own life quality; and to share with him critical information (alerts and alarms) about how his current life situation, orientation, and criteria are risk sensitive.

According to a variation of this eleventh instance embodiment of MNS, applying a neural network to monitor dimensions of the profile includes: (A) electing a perspective selected from the list: the user, and a caste of users having understanding of the weighted and filtered projection (of the understood at least one needs description onto the at least one electronically stored knowledge-base); and therewith (B) abstracting user proportional (i) vectors of wellbeing onto the monitored dimensions, and (ii) derivatives or gradients of these vectors. This is better understood and appreciated when considering dimensions of the profile as "current MNS wellbeing quantification(s)" (as described above). Furthermore, according to a preferred construction of this eleventh instance embodiment variation, of MNS, WHEN the electing a perspective includes a caste, THEN the abstracting includes (A) crowd-sourcing the caste by transmitting a solicitation to a substantial plurality of members of that caste; wherein the solicitation includes (i) the respective user's current particulars of life quality metric quantification, of flourishing life opportunity, and of future flourishing life longevity horizon; and (ii) a request for the member to provide at least one response selected from the list: advice, opinion, recommendation, comment, vote, and gifting to the user of some quantity of a wellbeing currency; (B) aggregating the members' response to form a concept-picture of applicable collective best practices knowledge understanding of the user's life quality metric; and (C) sharing this concept-picture with the user and with the substantial plurality of members of that caste. In this context, a concept-picture is any of free-form text, illustrations or diagrams therewith, summary text, quantifications, metrics, statistics thereof, graphic representations thereof, and the like.

Figure 3:
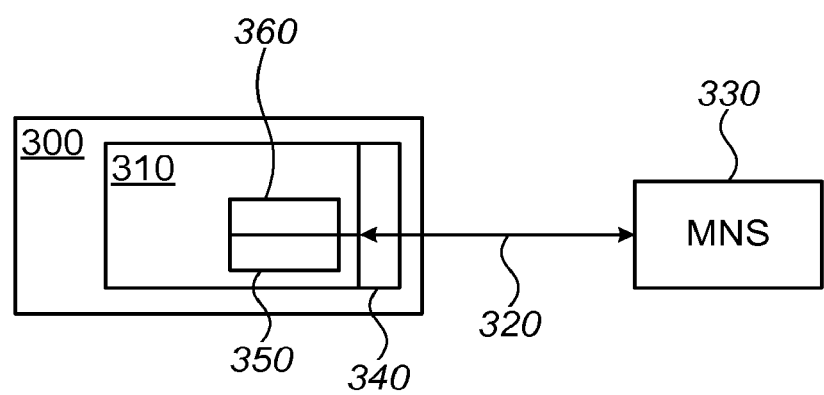
FIG. 3 is a schematic view of an MNS Appurtenance for acceptable public access.

Turning now to FIG. 3 is a schematic view of an MNS appurtenance for acceptable public access;

This invention also relates to embodiments of an MNS Appurtenance, for improving at least one wellbeing state (as heretofore described), wherein the MNS Appurtenance (300) is comprising: a software driven platform (310) with (a) a public access electronic communications protocol (320) for exchanging data with an MNS (330) (Mutatis Mutandis); (b) a data filter (340) for preserving respective privacy of users of the system and of a postulator of a query from outside of the system; (c) at least one first format (350) that is arranged to enable the postulator to focus the query onto a caste of MNS users having understanding of the weighted and filtered projection by at least one virtue (as described above); and (d) at least one second format (360) that is arranged to enable the postulator to deposit at least one input is selected from the group consisting of: advice, opinion, recommendation, comment, vote, and gifting to the user of some quantity of a wellbeing currency. Simply stated, this appurtenance allows simplex or duplex interface with a non-MNS user; according to the quality of trust and quality of privacy acceptable to members of the community of MNS users. The appurtenance allows individuals to partially experience MNS, researchers to glean knowledge from MNS, and the like; and provides any of them (as postulators) to contribute knowledge, understanding, comments, impressions, goods, services, and the like, back to MNS. By example, a MNS non-member may use MNS to discover a need, and may then use MNS to contribute to helping alleviate or answer or solve that need. (as described in the identity confirmation process, a non-member is a user but his an identity has not been confirm or validated; and he will have limited access to the MNS information and community.)

Furthermore, according a first instance embodiment of the MNS Appurtenance, the software driven platform includes a neural network (Mutatis Mutandis) maintaining (a) a current valuation for the wellbeing currencies (which is selected from the aforementioned group); (b) a normalization exchange index between the selected wellbeing currency and a plurality of other wellbeing currencies from aforementioned group; (c) a feed-forward model positing selectively transferring of a measure of a wellbeing currency; and in compliance with the valuation, normalization, and model (d) submitting a transaction to the MNS to enact a transferring as an MNS stimulus using any of: loans, gifting, pooling, and aggregating of wellbeing currencies from the postulator to at least one user within the caste. Simply stated, this "first instance embodiment" opens up views of the MNS wellbeing currency economy; wherein the value of "favors" (as was described in the context of "Economic Issues" above) and other amorphous or abstract life quality values.

This invention furthermore relates to embodiments of a scholarly MNS repository archive portal, comprising (A) a software driven platform enabled for electronic communications interacting with a data-cloud of MNS events which are arranged according to community and to caste therein; and (B) an archive of the data-cloud. These events include a current standard MNS wellbeing quantification; a history of how that current quantification developed and "evolved"; comparison to respective other life quality metrics; census style demographics of user profiles and user profile wellbeing "progress"; characterizations and categorizations of (neural network) alerts and alarms; life events; and the like.

In summary, MNS is about (I) appreciating the importance of wellbeing awareness, (II) having access to choose the best "appropriate wellbeing" practices, In the MNS "practicing wellbeing" means to have decision and choices that improve the "wellbeing" of the member, according to his Wellbeing Criteria and Orientation, therefore the MNS incorporated methods, algorithms, systems and information, to assist the members to have the right choice and help him to find the best solutions to his needs, to increase his "Wellbeing", (III) feeling confident about trustworthiness, (IV) motivating each members to help improving his wellbeing, (V) helping other members to improve their wellbeing, and (VI) creating mutual trust. In the MNS "practicing wellbeing" means to have decisions and choices that improve the "wellbeing" of the member, according to his Wellbeing Criteria and Orientation; therefore, the MNS incorporated methods, algorithms, systems, and information, to assist a member to have the right choice and to help him to find the best solutions to his needs, so as to increase his "Wellbeing".

Appreciating the Importance of Wellbeing Awareness: Wellbeing relates to positive Life orientation standards. Appreciating these standards gives people better choices, better solutions, and a better life. Wellbeing appreciation motivates people to choose long term solutions that help them to have better, meaningful, rewarding, happier and healthier lives. Experience with wellbeing appreciation motivates people to explore and consider ideas to enhance their own wellbeing; ideas often more mature than a person's instant-goal limitations and life-history biased orientation.

Having Access to Choose the Best "Appropriate Wellbeing" Practices: Late in his almost 70 years as a Freud trained Neuro-Psychiatrist, Dr. Henri Baruk often lamented "best practices" as typically relating to what is easiest for the care-givers; even if contradicting the patients best interests. MNS is not about what is easiest. MNS advocates informed user life choices. Because the user is always learning and experiencing, MNS's aspiration of providing him with informed life choice is an ongoing process. MNS seeks to empower the user to define his preferences, his wellbeing priorities, and his limitations. For MNS, a best answer/solution to a user's needs is compliant with the user's preferences, priorities, and limitations; informing him about wellbeing variability issues; and trying to catalyze his choices into reality. MNS is always looking for to access, integrate, improve ICT (information communication technology) resources, and for better information, algorithms, and solutions; so that the user may profit from better real time results and a better vision of how those results might impact on his over-the-horizon life-quality. MNS is also about helping to create, facilitate, and manage a social network of members; wherein each MNS user-to-user introduction is in agreement with the users' respective profile and needs expressions and the users' wellbeing aspirations. MNS optimistically hopes that every mutually accepted MNS introduction will contribute to a maturing and improving of wellbeing for the respective users.

Feeling Confident About Trustworthiness: MNS wants users to partner mutual wellbeing together. Essential to that vision is to maintain MNS as organizationally transparent; regarding user privacy, wellbeing standards, responsiveness to user feedback. MNS believes that a social network facilitating serves at least three purposes; helping users to engage other users for better understanding of instantly available knowledge, helping users to organize into mutual ongoing wellbeing (orientation and/or criteria) grouping, and enabling lasting bonds of wellbeing supportive friendship between users. For MNS, the quality of user knowledge improves with understanding; and social networking users to other users who can help facilitate such understand is among our highest wellbeing ideals. In order to further this ideal, to make it easier for users to help empower improved collective wellbeing, MNS is also committed to help facilitate a fungible unit for wellbeing exchange currency.

DESCRIPTION OF EMBODIMENTS—DETAILED DISCUSSION

It is a core motivation of central embodiments of MNS to network the user into best-appropriate answers and solutions to user's needs. According to many MNS embodiments, this is accomplished by (A) knowing the user, (B) understanding the user's needs, (C) accepting the user's perspective, (D) finding best-appropriate answers for the user's needs, and (E) preferably to provide appurtenances for networking the user into those answers. For many information systems, "best-appropriate" is typically biased by the commercial interests of the systems provider; often because knowledge of the user is a valuable commodity to advertisers, direct marketers, planners, credit agencies, and the like. Simply stated, for most systems, "best-appropriate" is not altruistic to the user's needs. For MNS, "best-appropriate" is typically biased by the user's own choices and values; even though the user is actually using the needs navigator to try to get "out of his own box"—which is to access (or verify) possible solutions to his own needs. Accordingly, the user's values and choices are interactively evolving as the user becomes aware of alternatives and new choices; which, in turn, may beneficially change the user's needs.

Furthermore, by networking the user into those answers, MNS is trustworthy best-practices user resource; rather than a totalitarian big-brother. Simply stated, in juxtaposition to commercial systems, the core values of MNS are integrity, trust, user privacy, altruism, and respect for user values and preferences; which is to be innately loyal to the user. MNS helps a user to define his own needs, to explore the solutions to his needs, and to network him with respective knowledge of means to increase his life-flourishing level of wellbeing. Embodiments and expressions of MNS values are helpful for expanding the user horizon to directly network between user needs and user best-appropriate answers; which are typically outside of any oversight of MNS. Thus, from the perspective of MNS, matching a peer-to-peer social networking, between the user and answer's to the user's needs, is a goal of the highest order.

Now, returning to FIG. 1, preferably, "knowing the user" (120) is a trustworthy process of forming and maintaining a User Needs definition space, wherein an MNS builds an information cumulative relationship with the user. From the perspective of MNS, a user is a combination of values, purposes, preferences, inner "personality", and profile data.

One aspect of the relationship between MNS and the user includes an accumulative self definition disclosure which typically relies on the needs navigator preserving the user privacy from both external search and external analysis. A second aspect of this relationship includes the needs navigator generating and accumulating a profile of the user from public sources; and it would furthermore of value for the user to be able to view and to modify that profile. This is not to imply that the needs navigator can change the users public profile, but that the needs navigator will typically give preference to the user's profile attribute disclosure over the attributes provided from external sources.

Nevertheless, there may be cases where logic heuristics of the needs navigator suggest that the user consider that the public profile may be more accurate than the user's self definition, and therewith that the needs navigator may be more successful in matching potential solutions to the user's needs when applying a version of the public profile. Nevertheless, the needs navigator will firstly attempt to make best use of the user self disclosure having preference over the public profile for the user in all attributes where there is some measure of conflict there-between. A third aspect of this relationship accumulates a user provided needs description which may include free text, category labels, key words, user assigned subjective grades or ranks, and even items objective evidence such as pictures, symbols, videos, audio recordings, scans of documents, or the like.

Furthermore, preferably, "understanding the user's needs" (130) is a complex process wherein MNS may require iterations, alternative orderings of steps, and even involvement of external entities. One aspect of understanding the user needs includes interactive and automatic needs description classification, such as into key words, synonyms, markup language, or with further free form text. In this context, the need my relate to any of goods, capital, credit, services, opportunity, association, know-how, or relationships between any combination of humans, profitable entities, charitable entities, NGOs, governmental groups, professional societies, education establishments or the like. Another aspect of understanding the user needs includes the economic perspective of the user for accomplishing partial or complete progress past that need, such as the user need is to give, to receive, to barter, to purchase, to sell, or to credit as a financial instrument or even as honor or redeemable need-points. There are further optional aspects which may be useful for the understanding of the users needs, such as independent classification by a moderator (who can be a real human being, a virtual software agent, or even changing combinations of these) who may be selected by matching with user classification, system classification, or the like. Thereafter, at least one such moderator may interactively work with the user to improve scope and detail to the needs disclosure, to the needs classification, and to help design a program or scenario that structures the user need into sub-needs, steps, processes, components, attributes, or the like; as appropriate. Independently or in conjunction with the moderator, these optional aspects may be wholly or partially accomplished by the system or by affiliates of the system; such as by using automatic or semi automatic programs, by navigating the user through appropriate educations modules, or by directly networking the user into appropriate support groups, need specific targeting agencies, or the like.

Now that there is a more ontological understanding of a user's needs, MNS will preferably begin a process of accepting the user's perspective. For virtually every aspect of accepting the user's perspective, it is appropriate to establish both a transformation into the user's solution space orientation, perspective, and vantage, and to the user assigned or suggested cut-off filter parameters for each dimension of that abstract user solution-space. Exemplary aspects of this perspective may include (A) by availability, such as instant, near term, conditional on qualification, potential, on a waiting list, indeterminate, or the like; (B) by duration, such as once, over the course of a few instances, until conditions change, for the life of the user, in perpetuity, or the like; (C) by cost, (D) by eligibility, (E) by proximity, such as to the user's current location or to locations that the user accepts as potentially viable, or the like; (F) by user similarity, such as to user-similar entities as may be provided by a support group or a chat room, by users of greater or lesser experience in the needs area, such as is typical in mentor-trainee relationships, by user need appropriate experts, or the like; and (G) by quality, by, such as might be proportional to at least one combination of some of these perspectives (A-F), such as by level of expertise experience, by level of prior user satisfaction rating, or the like. Remembering the range of human needs, expertise may be anything from medical, dental or legal expertise to longstanding status as a grandmother, crisis counsellor, care provider, experienced user, or reading tutor. As an example of MNS attributes specific to a type of need (such as for a dentist and/or dental care), relevant attributes may include: child-friendly, expert in implants, diligent about prevention, experienced for root canals; or attributes specific to a type of need (such as a school), relevant attributes may include: level of or emphasis on academic results, art, sport, wellbeing, happiness, creativity, participation, and the like.

Turning now to a core motivational facet of MNS, it is essential to allocate resources to finding best appropriate answers for the user's needs; now that the needs are expressed, classified, and understood from the user perspective. Nevertheless, there are instances where these resources may have to be invested in searching over the horizon of the user perspective expectations; firstly because there are typically instances where solutions to user needs are outside of the user's conceptual box, and secondly because user choice will exclude such options if these are less worthy of user considerations than more user familiar (in the user's conceptual box) solutions. Accordingly, embodiments of the needs navigator budgets these resources to any combination of (A) searching of databases, knowledge bases, professional societies, licensed professionals, organizations, social networks, and the like; and (B) targeted message query of individuals and groups who may have necessary need specific knowledge to suggest solution or solution heuristics appropriate to the user need. Merging these results and responses, the system may then present them to the user or allocate further resources to enhance, extend, modify, or restrict another iteration of this needs-matching solution option building process. An optional aspect to any stage of this process includes calculating a wellbeing index for any combination of search, query, or result; and sorting according to the index or even filtering out results that are below an exemplary minimal moral threshold of the needs navigator. Simply states, while the needs navigator is making efforts to comply with the user concept of best, the needs navigator also is directed to maintain a meta level standard for best as might be viewed for the user, the user's family, neighbours, community, and larger society; both now and for any scale of extended or sustainable future.

Finally, appurtenances of MNS network the user to these answers; the needs-matching solution options which comply with user and system expectations, including constraints. It is preferable for the network navigator to present these results in a potentially multi-dimensional space format according to the user orientation; such as were negotiated by the user in the ontological approach description (above). Nevertheless, since the very knowledge of these results begins to alter the user orientation, MNS is available to transform this space into other orientations; such as according to wellbeing index, according to a generic perspective of an appropriate respective solution expert or the like. All of these formats (and respective options for the user to return to previous stages of the needs expression, definition, understanding, and classification) are to allow the user a capability to find a best solution to the user need. The tangible result of any of these combination is to allow the respective user to network communicate with the respective user's MNS selection. This creates the option for the user to add a social network link between the user having a need and at least one person or entity who may be appropriate to assist the user in solving that need or in progressing that need into a user appreciated betterment.

Returning to a basic aspect of MNS, a respective solution often includes items of knowledge and typically also includes access to persons or entities having substantially complementary capability to the respective need. Accordingly, just as knowing the user is a trustworthy process of forming and maintaining a User Needs definition space, knowing the user also presents an opportunity for the user to authorize MNS to consider factors pertaining to the user when seeking to find a matching solution for another user. This can lead to a curious anomaly in the aforesaid multi-dimensional space format because some users may be ranked as potential appropriate solution providers without disclosing their actual private details. For this to be accomplished, solutions should be clustered into substantially equivalent sets, so that private detail of any user could not be induced from respective clarification-type rankings.

Now, returning to MNS accepting the user's perspective, for any specific need or for understanding what motivates the user to manifest a needs-matching search through the needs navigator, the entire idea of "best appropriate" is in fact a highly multifaceted issue. In a simple case, best may mean any of the following: least cost, minimum risk, optimal cost benefit, most exclusive, most expensive, largest, smallest, or maximum or minimum of a formula or function (of a user, of his weighting of the attributes of his needs, and/or of the rating of the solutions' attributes provided by experienced users or experts), or the like. Alternatively, best may mean according to the user's intuition of where a new solution to an existing problem may be found, or according to the user's intuition of where a solution or partial progress may be found to an unsolved problem, or simply following the user's hard-to-parameterize sense of inspiration. Thus, where rational mini-max type problems may have easy to navigate search spaces for their solution or iterative improvement, there are other problems where the user is asking an MNS to partner in the user's perspective of best. Exemplary cases are situations like: best way to redecorate a room in my home, best way to make my favorite recipe taste more exotic, best way to be happier when I am waiting on a queue, or the like.

Simply stated, just like best may sometimes imply some mathematical maximum or optimal, best may sometimes imply coming closer to some instant indeterminate personal goal or distancing from some intractable complexity or the like. Yet a further, more complex or more abstract, notion of best is where the user is either seeking to be inspired, seeking to follow an inspiration, or to explore over the user's horizon; sometimes in a direction of the user's curiosity and sometimes is search of a direction that would otherwise even seem counter-intuitive to the user. Accordingly, the user is not exactly seeking knowledge, but seeking instant strategic partners, or advisers or experts who can provide best solutions; and more specifically, the user is seeking an MNS social network facilitated introduction to that partner or those partners or into that community. In the social science literature, this would be akin to helping a user to apply to an "invisible college", which is a clique or cluster of mutual interest collaborators; where the interest may be spontaneously arising (such as an instantly arising charitable focus), evolving (such as a changing news event), or stable (such as a support group or a study group). It is in this context that the needs navigator wellbeing index takes on a special importance.

Another objective of MNS embodiments is to facilitate users to be empowered and helped in defining their preferences, such as to be able to define general negative preferences (such as by filtering out any solution which includes pornography, or cruelty to animal); and to assert specific positive preferences, such as for specific needs (such as when they define a need to find a school for their child, they can have specific preferences such as emphasis on child participation, wellbeing, social activities, arts, science, developing values, confidence, cost, etc.).

To better understand an exemplary MNS methodology, those innately familiar with Piaget, (Swiss developmental psychologist and philosopher known for his epistemological studies with children) and his predefined ontology methodology, would be well advised to appreciate the less-structured formalisms pioneered by Vygotsky, (Soviet Belarusian psychologist, the founder of a theory of human-cultural and bio-social development) and his respective user-defining ontology methodology. To this end, exemplary MNS needs definition methods may often accept Vygotsky-type user perspectives, rather than trying to fit the (user's) "square peg in a round hole" (of predefined attribute classification); which is the typical Piaget orientation of most prior art data mappings. Accordingly, in the MNS context algorithms, there is a necessary step of finding appropriate knowledge that matches needs; while for the MNS Appurtenance algorithms, there is a necessary step of finding individuals knowledgeable in the relevant respective details of that appropriate knowledge.

Beginning with MNS context algorithms, as has already been well understood from relational databases, each need can be decomposed into attributes, sub-attributes, components, classes, and the like. For example, needs for finding a school for my child can have components, attributes, tags; such as: cost, distance, time (When the service has to start and finish and/or do I need school starting ASAP, or for next year?); academic results, arts, music, sports, social activities, happiness of children in school, discipline, building confidence, motivation for self-learning, based on authority or child participation and empowerment, existing friends going to the same school, and the like (hereinafter exemplary attributes of this user's schooling "needs"). These needs can belong to a class: education; and to sub-class: learning for wellbeing and/or character development.

For each attribute, the user will be able to define the weight of each attribute including exemplary options: using a number or ruler to specify 0 (not important) up to 10 (very important) and/or to express a mandatory requirement, condition, exclusion, or limitation (in a positive or negative definition); such as, Catholic education—mandatory, or definitely to exclude. The user will be able to decide that the user first prefer to define the weight by himself, or first to get recommendation based on other user in a group (such as one that the user belongs to), and/or choose to filter (such as I want to see the average, or use default weight of academic parents in my city only or see the preference of parents who are also teachers, or recommendation of experts in this field). The user will be able to change the weights, to save them, and to view his prior assigned weights.

Furthermore, MNS accepts and integrates feedback regarding experience and knowledge of each potential solution for a need. Because the MNS feedback provider may be contacted (even if optionally anonymously) by another MNS user with a similar need issue, MNS motivates for users (and experts) to provide reliable and honest information. For example according to an MNS embodiment appurtenance, by a friendly app which the user get reward acknowledgment (or wellbeing points or credits) when using and/or providing information; such as from a mobile phone, tablet, computer, interactive TV, communications enabled games platform, or other input device that is connected to the internet, mobile network, or Wi-Fi. Input may be provided by touch, speech, game play, and/or by answering a telephone call, an email, SMS, etc. The reward can be any combination points, credits, coupons, virtual or real money (currencies as heretofore defined), or the like that motivate; including progressing in a scale of titles and roles, entertainment, immediate positive feedback (text, voice, picture, icon of thank you, etc.) and any combinations of these.

Since MNS can provide solutions which comprise a negotiable best-appropriate transition space between Piaget and Vygotsky ontological methods, the list of needs, attributes and solutions can also be created and updated by combination of input by experts, input by users, input by software (using other information such as the internet, data bases, etc.).

Each user will be identified to authenticate that the user represents a real user. MNS may use combinations of methods to validate and authenticate users, such as telephone numbers, names, address, date of birth, recommendation by other users, bank accounts, passport number etc.

When the user defines a need, the user may be able to define how urgent the user requires to see a solution (ASAP, in a hour, day, week), how many solutions the user would like to see, what will be their ordering criteria (such as by cost, distance, height score etc.), to filter out aspects and attribute combinations before and after the user receives the solution list, specific types of solution, or specific solution, and the user will be able to choose a subset of the solution list. An MNS search algorithm finds a short list of the best solutions which give highest score between the attributes of the user; including the weights of each attributes, the potential solutions with the score (or rate) of each attribute, and total score. When users provide information and feedback about specific solutions, MNS will collect some parameters about the respective user and providers. MNS saves the feedback information from the user with the user's profile (e.g. age, location, profession, education etc.); thereby helping to build better filter quality for later results of specific types of users. MNS may employ volunteers and/or experts to manage and moderate the information, filter out users who do not comply with MNS ethics and regulations (such as those who are not honest, try to promote their own solution or friend's solution, etc.) Preferably, MNS includes experts, who can provide professional input and explanation that can help other users; and most preferably, these experts will be available for consultation in their areas of expertise. These experts are the educators of those who need their expertise. Thus, the expert contributing structure and suggestion (integrated into MNS), to help the user define needs and attributes, benefits both the experts and the users.

Important needs and solutions come in different scales, from individual to global class, and general wellbeing. Accordingly, appreciating experts and their respective fields of expertise often includes profiling additional information, such as research publications, specific types of methods, "schools" of solutions (what is Chi Kung, what is Steiner education, what is child participation, how it can be evaluated and implemented, etc.). Experts may also differ in the ways that they help to define short term and long term priorities, and the like.

From the Piaget methodology vantage, specific needs and solutions can incorporate specific known matching algorithms between needs definitions and knowledge-bases of solutions; whereas alternative experts and more amorphous needs generally rely on Vygotsky type methodologies, and emerging algorithms, to calculate level of need, of attribute, of score for specific solution, etc. For example, in the areas of known matching algorithms between needs definitions and knowledge-bases of solutions, there are many general health programs devoted to specific health aspects; such as cardiovascular health, mental and emotional health, dental health, fitness, Now, beginning a transition from Piaget to Vygotsky type algorithm optimization, for cardiovascular health, exemplary MNS algorithm starts by establishing medical accepted cardiovascular health scores (such as is provided by: Qrisk and/or Mayo Clinic—cardiovascular disease risk calculators, CardioSource ASCVD Risk Estimator, and/or Reynolds Risk Score—each of which predict probability of cardiovascular diseases), and then firstly searches and crawls through MNS access databases to recommend solutions to reduce these risks, and secondly correlates these solutions back to MNS users who are available as educators and consultants regarding such solutions. Furthermore, by collecting and saving the information, MNS checks which prediction algorithms are better for specific population; and preferably explores and simulates improving them (by iterative combination of expert system with real human experts' feedback).

MNS matching algorithms firstly use existing known mathematics searching algorithms, and also specific algorithms for specific types of needs and solutions. However the gamut of potential needs includes many problems that are not exactly solved by quantification of variables; such as the exemplary need for finding who can be my best potential partner for life, and which of the many subjective criteria are most significant to consider therewith. Thus, according to the subjective aspects of the need and the shrinking size of population known to have expressed (or been observed) with like need, MNS transitions from appropriate Piaget type predetermined classification templates to define need to more Vygotsky type strategies to evoke descriptive aspects of the need from the user; such as aspects that are objective, subjective and even substantially subconscious information. Continuing the exploration of the "best potential partner for life" example, many users may choose partner based on external appearance; but will find after short or long term that they are not happy to live with the partner so chosen. From the user, MNS collects many parameters, attributes, and feedback; both after short term and long terms, and preferably incorporate exemplary neural network algorithms to improve the ongoing MNS matching algorithm.

As is better understood in the more subjective disciplines, MNS looks at objective attribute weighting requirement, but allows significant consideration to subjective attribution; such as, expressions of how much the user enjoys to be with the potential partner, will the potential partner be an excellent parent to future children; can that partner help me to develop my self, career, meaningful life, and the like. In a sense, subjective responses can be objectified (understood) by expanding them through attribute synonyms, filtering them according to profile of the user, calibrating them according to the spectrum of expression (some users express in degree of positive while others express in degree of negative, etc.), and then matching "as if" objectified. As MNS incorporates more users and historical information, MNS algorithms and attributes improve; to help to define better the weights for each needs, and the best solution. Another aspect of this improvement is that MNS motivates and encourages members to interact, to bring friends as members, and to provide feedback and advices to improve MNS.

As a positive Life orientation standard, further objectives are for MNS members to feel that the MNS really is helping them (and others) to have better choices, better solutions, and better life; to be proud of and enjoy being members; to feel that they are part of MNS and that MNS belong to them; for members to be keen to improve MNS; and to bring more friends to MNS. Simply stated, these objectives arise when MNS motivates members to choose long term solutions that help them to have better, meaningful, rewarding, healthier life; in contradistinction to typical search engines that are stuck in the instantaneous now solution mentality. MNS algorithms search to include solutions that show users that the best way to increase their happiness, is by helping others and themselves, and not by just consuming more nor to be infused by advertisements to spend and to buy.

Furthermore, as a social network facilitator, by algorithm and by user acquiescence, MNS integrates groupings of user with specific common interest, needs for-help, and needs to-help motivations; such as a network of people who want to explore and practice spirituality, vegans, artist, even religious group or political parties. Again, MNS keeps the information of its members privately and never disclose the information of specific member to others. However, if the user chooses to send a request to receive solution from a supplier (such as a Commercial supplier), then an MNS appurtenance will protect the privacy of the user by substituting user identity to a pseudonym for the request; whereby the user will provide his real identity and details (kept confidential by the MNS) and MNS will create a virtual buyer who will be the external virtual buyer that others (including commercial seller/supplier) can see. Regarding seller/supplier responses (to the pseudonym), MNS saves the potential offers and solutions, filters and sorts them according to the user preferences and weights, and presents the uses with the results (as many as the user prefers, according to his choice of order). Thereafter, the user will be able either to order the solution directly from the supplier, or MNS will receive the solution via the virtual buyer (pseudonym) and transfer it to the user.

Regarding time parameters, MNS includes user-defining weight for the time of the solution, when it is needed, and for how long; such as: need a solution ASAP (health emergency), in the next few days, year, or the like. Other types of needs are less well defined regarding time, such as for a singular long term solution to find a partner for life, to choose to learn a profession, or to accumulate experience in a self-improvement skill. Another aspect of time relates to the substantial difference between automatic spontaneous almost-instant decision making and slower learning-curve evolving rational decision making. The MNS appurtenances are most helpful to mature the user, from the spontaneous to the rational selection of solutions for needs; because the respective relevant-knowledge members associated with the user's MNS network share experience and understanding that the user is lacking.

Regarding currency, MNS allows interesting solutions to co-define with a respective social enterprise; such as for sharing most of an enterprise's profit; which is the case for operational expense limits as a percentage of donations. Likewise, for MNS embodiments, membership fees or transactions fees will be reinvested in developing and improving the MNS and/or increasing domains and membership and/or allocation of a small percentage as shares as bonuses for reward to members or for active members according to their contributions or the like. Consistent therewith, regarding currency transfers and payments, another exemplary MNS embodiment aspect relates to using real (nation-state) currency and/or MNS's own virtual currency, combinations or different types of currencies, and/or alternative "currencies" (such as BitCoin, BullionVault, GoldMoney, and the like). Accordingly, MNS may have agreements with banks, credit card companies, and other organizations, in order to manage financial transactions. Preferably, according to such agreements, MNS' members will be able to pay to other MNS members (or to organization) with minimum cost in the following exemplary process.

Each member will be able to open an MNS online Wallet. This can be in any currency that is authorized by MNS (real or virtual currency, gold etc). He will transfer to his MNS account any amount from his bank (or other organization authorized by MNS). The user will then be able to pay from his MNS Wallet to another MNS user by authorising MNS to subtract the payment from his Wallet and add it to the receiver Wallet. In this way these transactions will not cost MNS the usual bank-to-bank funds transfer charges; as long as the transactions will remain within the MNS Wallets of the members. MNS will have to reach agreements with the relevant banks and organization regarding transfer funds and other currencies from the customers accounts to their MNS Wallets and vice versa, converting between currencies, managing these MNS Wallets, insurance etc. MNS may have its own (issued or certified) credit card and/or debit card systems for this purpose. MNS may use Blockchain technology to manage currency transactions, and/or other information.

Regarding life-flourishing level of wellbeing, an aspect of each respective user-specific definition progresses from initial user-profile definition and respective initial MNS definition to mutual growth and customization; according to specific users group, total life authentic happiness, wellbeing, flourishing, satisfaction, and the like; as described earlier, according to respective synonym, calibration, and such. For some people, the most important attributes can be hedonistic pleasure, where short term issues are more important that long term ones; while for others, the greatest weight objectives are to have meaningful long term life, to feel both healthy and satisfied, to sense accomplishment and growth, to contribute to the society, and such. Using attribute synonyms, respective user relevant filtering, calibration (normalization), and matching, MNS helps users to combine qualitative and quantitative parameters with subjective information, so that the user can express and MNS can include the user's intuition, advice (from the user's partners, family, consultants and friends); to help the user to learn to choose the best solutions, and to make better decisions, which increase their authentic happiness for the short and long term. Thus, MNS algorithms often take into account the classes of the users, their past preferences and weights, the classes of their needs and the solutions.

Further objectives of MNS are to let the user define his priorities to influence his results; to be organizationally transparent so that weights and priorities of results are not biased by MNS income nor advertisers; to protect user privacy regarding profile, needs, queries, interactions, and solutions; and to allow the user to see how MNS evaluates the user's attributes, weight, sub-components, need, feedback, satisfaction, and the like.

Another MNS example starts with a subgroup and a domain of needs, wherein the sub-group is young people (such as in high school or recently finish high school or university student or recent graduates or aged 15 to 30) and the main domain of needs is how to chose and plan the next stage in life. As in other MNS examples, some attributes are general for the subgroup and others may be highly subjective and particularly personal to the level of each individual; which corresponds to attributes easy to access according to Piaget type predefined categorical query, and attributes which must be evoked by vague Vygotsky type query (in forms like describe and explain in your own words how you see planning and choosing the next stage of your life, etc.). Thus, in the predetermined type query, issues arise like grade, level, exams taken, respective marks, subjects chosen, institutions and/or programs that the user intends to apply for (such as specific university, apprenticeship, etc.) or to volunteer for or employment track (as a short term plan, a gap-year, or as a path to further career development, etc.).

Thus, MNS may contribute focus for helping young people who are unemployed to find better solution to their existing situation for short and long term; where and how to find job in their country or other countries; how to use their time to progress and prepare themselves to have better chance to work or earn money in other ways; to develop a business, learn a skill, become apprentice, get experience, volunteer (Mutatis Mutandis) to acquire skills, experience, and references; to achieve self support maintenance (such as to get free accommodation and food—perhaps while addressing the growing needs to take care of elderly people—locally, domestically, or even as a foreign worker abroad). Likewise, there are many other instant career considerations; perhaps a mixture of received accommodation, food, salary, and savings. Similarly, there are places that need volunteers for farm workers during specific seasons, retreat centers which provide free accommodations and food for volunteers who help with cleaning, and companies who may take apprentices. Ostensibly, for this sub-group, part of the MNS may be to enlarge the users vision of options. MNS also recognizes that these same options vary greatly by location and national domicile; there being a substantially great need (in some countries) for young people to find work or to maintain themselves. Currently, Greece, Spain, Italy and even successful countries such as UK have a large percentage of unemployed youth. As a social network appurtenance, MNS can match a young person with pensioners (who may have empty room and will be happy to let it free to a young person in exchange of some help), families (with young children who may offer free accommodation meals and some pocket money in exchange of taking care of their children part time), and the like. These are simple examples how the MNS can start in a very specific domain in which there are unmet needs and no proper methods to find solutions which can meet these needs in anything resembling an optimal way.

Now, regarding weights, for MNS, attributes with numerical values can have different weightings according to each member's priorities; including for his wellbeing orientation and his wellbeing criteria. Nevertheless, because subjectively assigned user assigned weights can be non-linear, calibration and normalization (to a common MNS conversion standard) may require transformation through a matrix.

Turning now to ten parameter charts for a user's actualization MNS results, here is an example of implementing a decision support table to help a user to make a choice between alternative solutions. Each need is broken down to attributes or sub-needs. According to this exemplary embodiment of MNS, links to a Database of all needs, attributes, and sub-needs; and these have been accumulated for users, from other sources, and include relevant available objective data. Furthermore, according to this exemplary MNS embodiment, this needs DB is MNS electronic communications compliant. For each attribute, previous users or experts gave scores or rating (either absolutely—objective score—such as "percentage of students who continue to study in a university" or relative to other schools). Likewise, the DB includes normalized relative scores, such as score in a "academic league table" according to specific attributes (academic results: best schools 100, worse schools 1; well-being score: best schools 100, worse schools 1; Art and creativity: best schools 100, worse schools 1; etc.). Each attribute (sub need) has a relative weight; and the MNS defaults for these weights are created automatically; such as normalized to fit a linear scaled average. According to previous similar users or experts; the user will have a simple ruler to change the weights of each attribute, and also to play "What if"; so when the user changing the weight or any parameter lets the user see how the total score result is modified.

TEN exemplary parameters helping to define "User Need": to "Choose a School for My Daughter"

Firstly, each chart (below) describes categories of rating scores for a specific parameter; wherein the parameter may be objective (such as: cost of tuition, distance from home, average class size, etc.) or may be subjective (such as: reported from a survey of parent and/or student perceptions of quality, sensitivity, discipline, etc.). Each chart then stratifies the rating scores into discrete ranges and respectively assigns rating points for each respective category; such as one thru ten in the exemplary charts below.

Secondly, a user of an embodiment of the present invention, will assign subjective weights to each parameter according to how important that parameter is to his best wellbeing choice; according to his current understanding. Weightings may also be negative; if the user considers the point assignment to be opposite to his orientation for the respective parameter. For example, a low income family may give great weight to a free or low cost school; an average income family may give moderate weighting to cost of schooling (in comparison to the weighting that they give to other parameters); while a very high net worth family may be looking for a very expensive school (so that their child will only be associating with other wealthy family based students), and will give a negative weighting to cost of schooling (since they actually prefer avoiding free and modest cost schools).

Thus, on the one hand, using these categories of rating, the respective assigned points for each school are used as a basis; and on the other hand, a user will define his/her needs (as to how important or unimportant each category is for their specific search) with respective weightings. Thereafter, the sum of (A) an algebraic combination of respective user need weighting, are multiplied with (B) respective points for categories of ratings, to form a single score total for each school; by which schools can be compared for relative appropriateness for the user needs.

M: Mandatory (must have).

SN: Should Not (must not have).

NA: Average (arithmetic average for a statistically significant sample).

GT: Greater Than (or more than).

LT: Less Than (or fewer than); by MNS default also including "equal to".

| M | SN | Value | 1 | 2 | 3 | 4 | 5 | 6 | 7 | 8 | 9 | 10 |
|---|---|---|---|---|---|---|---|---|---|---|---|---|
| LT £15k | | From value | >11k | 9000 | 7000 | 4500 | 3000 | 2000 | 1500 | 1000 | 500 | 0 |
| | | Up to value | | 10999 | 8999 | 6999 | 4499 | 2999 | 1999 | 1499 | 999 | 499 |

Parameter 1: cost user assigned weight for cost*7

The weight is a subjective weight that the users (parents in this case) can give according to how important this parameter is for them; e.g. if they are very wealthy they can give a low weight for the cost of the school and if they can't afford to pay too much they will give high weight for the score.

| M | SN | | 1 | 2 | 3 | 4 | 5 | 6 | 7 | 8 | 9 | 10 |
|---|---|---|---|---|---|---|---|---|---|---|---|---|
| LT 60 min. | From value | >46 | 41 | 36 | 31 | 26 | 21 | 16 | 11 | 6 | 0 | |
| | Up to value | | 45 | 40 | 35 | 30 | 25 | 20 | 15 | 10 | 5 | |

Parameter 2: distance (time to get to school in minutes)
user assigned weight for distance*5

| M | SN | | 1 | 2 | 3 | 4 | 5 | 6 | 7 | 8 | 9 | 10 |
|---|---|---|---|---|---|---|---|---|---|---|---|---|
| GT A\|A | LT 60 | From value | | | 64 | 69 | 74 | 79 | 84 | 89 | 94 | 100 |
| | | Up to value | | 60 | 65 | 70 | 75 | 80 | 85 | 90 | 95 | |

Parameter 3: academic results
user assigned weight for academic results *8

| M | SN | | 1 | 2 | 3 | 4 | 5 | 6 | 7 | 8 | 9 | 10 |
|---|---|---|---|---|---|---|---|---|---|---|---|---|
| GT A\|A | LT 65 | From value | | | | 69 | 74 | 79 | 84 | 89 | 94 | 100 |
| | | Up to value | | | 65 | 70 | 75 | 80 | 85 | 90 | 95 | |

Parameter 4: wellbeing
user assigned weight for wellbeing *8

| M | SN | | 1 | 2 | 3 | 4 | 5 | 6 | 7 | 8 | 9 | 10 |
|---|---|---|---|---|---|---|---|---|---|---|---|---|
| GT A\|A | LT 50 | From value | 54 | 59 | 64 | 69 | 74 | 79 | 84 | 89 | 94 | 100 |
| | | Up to value | 50 | 55 | 60 | 65 | 70 | 75 | 80 | 85 | 90 | 95 |

Parameter 5: art and creativity
user assigned weight for creativity *8

| M | SN | | 1 | 2 | 3 | 4 | 5 | 6 | 7 | 8 | 9 | 10 |
|---|---|---|---|---|---|---|---|---|---|---|---|---|
| GT A\|A | LT 50 | From value | 54 | 59 | 64 | 69 | 74 | 79 | 84 | 89 | 94 | 100 |
| | | Up to value | 50 | 55 | 60 | 65 | 70 | 75 | 80 | 85 | 90 | 95 |

Parameter 6: values (developing character, attitude, confidence)
user assigned weight for values *8

| M | SN | | 1 | 2 | 3 | 4 | 5 | 6 | 7 | 8 | 9 | 10 |
|---|---|---|---|---|---|---|---|---|---|---|---|---|
| | LT 50 | From value | 54 | 59 | 64 | 69 | 74 | 79 | 84 | 89 | 94 | 100 |
| | | Up to value | 50 | 55 | 60 | 65 | 70 | 75 | 80 | 85 | 90 | 95 |

Parameter 7: sport and physical activity
user assigned weight for sport *6
If a user thinks that sport is very important and would like their child to be have a carrier in sport they can give higher weight for sport etc. But these weights are not the score 1 to 10 in each row. The score for each school in the row is multiply by the weight (of importance) assigned by the user. Notice that in other examples the score can be an exact parameter (such as cost of the school) while other of these parameters are not linear; nevertheless they organize into a table having parameter score categories—which in turn are multiplied by user weight and added into a total score. In this way we can even add together objective parameter such as cost or distance with a subjective parameter such as "how much my daughter prefer this school."

| M | SN | | 1 | 2 | 3 | 4 | 5 | 6 | 7 | 8 | 9 | 10 |
|---|---|---|---|---|---|---|---|---|---|---|---|---|
| | LT 50 | From value | 54 | 59 | 64 | 69 | 74 | 79 | 84 | 89 | 94 | 100 |
| | | Up to value | 50 | 55 | 60 | 65 | 70 | 75 | 80 | 85 | 90 | 95 |

Parameter 8: social life and friends
user assigned weight for social life *8

| M | SN | value | 1 | 2 | 3 | 4 | 5 | 6 | 7 | 8 | 9 | 10 |
|---|---|---|---|---|---|---|---|---|---|---|---|---|
| She will accept this | GT 0 | From | She will not accept | She will not be happy but may accept | We have to convince her | | ... | She will agree | OK for her | Yes | Be happy | keen |

Parameter 9: my daughter preference
user assigned weight for my daughter preference *10

| M | SN | | 1 | 2 | 3 | 4 | 5 | 6 | 7 | 8 | 9 | 10 |
|---|---|---|---|---|---|---|---|---|---|---|---|---|
| | LT 50 | From value | 54 | 59 | 64 | 69 | 74 | 79 | 84 | 89 | 94 | 100 |
| | | Up to value | 50 | 55 | 60 | 65 | 70 | 75 | 80 | 85 | 90 | 95 |

Parameter 10: facilities (grounds, swimming pool, gym, etc.) user assigned weight for facilities *7

Using the user's ten parameter defined needs, here is an example of scoring for 2 schools:

School A: Independent school with high academic achievement and excellent facilities.

School B: Good local state school.

School A scores (average rating per attribute—such as has been reported by existing and previous parents and/or students *multiplied-by* user weighting for the respective attribute):

Cost £12,000: score=1×respective user weighting 7+distance 42 minutes: score=2×respective user weighting 5+academic 96: score=10×respective user weighting 8+wellbeing 87: score=7×respective user weighting 8+creativity 86 score:=4×respective user weighting 8+values 67: score 4×respective user weighting 8+Sport 93: 9×respective user weighting 6+Social 72: 5×respective user weighting 8+Child Preference "She will agree": 6×respective user weighting 10+Facilities 93: 9×respective user weighting 7=Total user weighted score: 434 (7+10+80+56+32+32+54+40+60+63)

School B scores (average rating per attribute—such as has been reported by existing and previous parents and/or students *multiplied-by* user weighting for the respective attribute)

Cost £700: score=9×respective user weighting 7+distance 10 minutes: score=9×respective user weighting 5+academic 81: score=7×respective user weighting 8+wellbeing 86: score=8×respective user weighting 8+creativity 72 score:=5×respective user weighting 8+values 86: score 8×respective user weighting 8+Sport 66: 4×respective user weighting 6+Social 96: 10×respective user weighting 8+Child Preference "She will be happy" 9×respective user weighting 10+Facilities 92: 9×respective user weighting 7=Total user weighted score: 589 (63+45+56+64+40+64+24+80+90+63)

According to this exemplary MNS embodiment, MNS creates some default data for the user and, much of the information is fed automatically by the system; such as distance home to school is derived using data from Google Maps. Furthermore, according to this exemplary embodiment of MNS, a reporting system enables people to report their score during and after using the MNS service; and MNS feedback experience scoring will be on satisfaction related to each attribute. The system will maintain score tables with information from users and objective sources. For example, there may be league tables similar to existing academic league tables, on character building, social life and wellbeing, and the like. The rating information (such as rating of creativity, wellbeing, values, social life) is collected from existing and previous users (e.g. parents and students) while the weight for each attribute is a preference of the user who is looking for the best solution to match his need ACCORDING to his respective weighted attributes preferences. In the above example we used for each attributes a matrix in order to bring different dimension who may not be linear to a common dimension. In reality, the table can be simplified, such as to having only a subjective rate and a subjective weight for each attribute (including features, aspects, synonyms, sub-needs, sub-solutions, etc.).

Further MNS Application Examples: Regarding (initial) MNS templates and standardized templates to help define need, for each data base of needs (or interface therewith), a main need is decomposed into components and parameters; thereby enabling an XML (markup language) space for needs. Returning to the dentist example, what is rating by experts, by current clients, by former clients, according to specializations, to demographic profile of clients, to skill set, and the like. Therefore, building (and sometimes even traversing) the respective need MNS space typically involves, escorts, experts, and moderators; who help initially define, build, and redesign the space according to their perception of respective hierarchy of knowledge, weightings, and structures; and later on escape from monolithic hierarchical views by applying feedback from clients to form data structure shunts, which in turn enable a plethora of other hierarchical views of the space. MNS thus partially enables MNS Social Networking appurtenances because accepting at least one needs description from a user and parametrizing the needs description allows MNS to update user's self-definition (profile) dimension; which in turn identifies the user with other users according to their (unbeknown to them) mutual hierarchical view preference among the plethora of hierarchical views of the space.

Now alternately summarized in more general terms, MNS is a Live meta-data Space wherein MNS appurtenances enable transient social networks and persistent communities or relationships. MNS is a dynamic software orientation accepting, modifying, and remembering user self definition, profiles, needs, and solution navigating choices. As an MNS abstract space, there is an evolving user self-defining dimension, an evolving system proximate/wellbeing dimension, a; solutions dimension, and a suppliers dimension; and, each aspect of each dimension leads to content and to communications. The content is the one-to-many mapping of needs onto user-preference filtered solutions; and the communications is the many-to-few mapping of those solutions back onto other users, experts, moderators, mentors, similar orientation users, and the like. An MNS creating network of knowledge directs the user to relevant web-page, chatspaces; while an MNS appurtenance creating network of social contacts directs a user to those who may be more knowledgeable about the knowledge that the user is seeking (to understand).

Furthermore, an MNS system monitor of user macro-activity and of micro-activity provides a guide to automatically enhance the user profile; since MNS also can monitor and classify aspects of and indicators of attention, retention, decision, neural activity; vocabulary of search terms, and chat room language, vocabulary, syntax, and grammar - - - all of which provide objective and categorical metrics for enhancing the MNS experience. This experience includes social network matching to matching to peers, mentors, and providers of solutions. An exemplary currency of shared favors is a voluntary time exchange between being a mentor and having a mentor. Accordingly, and consistent with the aforesaid, there is also a further preferred MNS appurtenance operable at a hub or network "level" whereby both respective-knowledge organizational certified moderators and users elected moderators may be distinguished.

Returning to the range of distinctions between answers and solutions, in the discussion of convolve (above), and appreciating that searching may be for goods or services or physical/tangible assistance (sometimes also in conjunction with knowledge) rather than exclusively for knowledge, a second similar aspect of an MNS appurtenance relates to solutions (for authentic needs) as enabling an instant charity generator; comprising an audit-ready template for monitoring needs, recipient guarantors, activity, e-funds and currency transfers, and delivery of physical goods.

Another aspect, in addition to value (score*weighting) of any parameter (such as cost of a service; health status at the present; percentage risk calculated at the present to get cardiovascular disease in the next 5 years), the MNS may store both historic results and also TRENDS of changes of these parameters during periods. The MNS may use these TRENDS information or gradient in similar ways as any other parameter or score. For example level of happiness can be depending on gradient (increase in salary/status) more than on absolute level. For example, a person whose salary each year increases by 4% may feel more happy that a person whose salary was higher but constant during the same period.

Another MNS Application Example: We assume that an MNS embodiment has already been implemented in London for 10 years; has collected and saved information from a very large number of people regarding many needs and solutions appropriate for rating dentists. Substantially each time that MNS users visited a dentist, they reported the following attributes:

1. Identification of the dentist (name address contacts).
2. What was the type of treatment they received (such as root canal, implant, filling, extraction of teeth, crown, bridge, or the like).

3. Treatment cost: How much it cost and a rating (do I think it is good value for money: 1-no; 2-quite expensive 3-fair 4-not too expensive 5-excellent value, cheaper than other, and the like).

4. Quality of the results: rating: 1-not good at all 2-but can be better 3-ok 4-good 5-excellent.

5. Friendly attitude (especially for children): rating; 1-not at all, Dr was rude/stressed, 2-not friendly, 3-OK, 4-nice atmosphere, 5-very friendly (Dr, explain everything and calmed me down).

6. Modern equipment: 1-very old . . . 5-state of the art equipment.

Therefore the MNS has, for each dentist, lots of collected ratings and required information.

When a user (John) has a need: "a dentist that can treat ASAP a tooth pain caused by infection and dental abscess, and maybe a root canal treatment"; The MNS will help John to define his need by presenting to him the relevant attributes of dentist (and even default weights that user with tooth pain gave) and John can decide what is the weight of each attribute, according to his preferences. The MNS will check all the dentists in the database; and the average rating for each attribute; and presents to John a short list of the best relevant dentist sorted out according to maximum scores of the total of the rating (by existing users) time weighting (by John) of each attribute.

For example—if we compare 3 solutions: One specific solution is a private dentist; "Dr Watson, 24 hour-emergency dentist clinic in Baker Street London." (very expensive £400 but available immediately and excellent quality). A second specific solution is: Local NHS (National Health Service) dentist (free of charge but have to wait 2 days and the quality of the service is not so good). A third solution is a private dentist Dr Bliss—John has to wait 10 hours and to pay £100 and the quality is good; (and each dentist in London can be another solution.) If John is very rich—the weight of the cost is not as important as the quality of the service; If John is short of money he may prefer to give more weight to the cost and his preference maybe Dr Bliss or the NHS dentist.

Graphical Link Organizer ("GLO"): Finally, as was anticipated by the illustrative scenario for FIG. 2, this invention furthermore relates to embodiments of a Graphical Link Organizer; which arranges large numbers of informational links into visual formats, thereby making understanding the large number of links and selective examination of information related to elected links more efficient for the user's purposes. MNS GLO embodiments are helpful for understanding (predominantly wellbeing-centric) results from an MNS type inquiry for answers and solutions. GLO is also of practical ontological value for improving search-and-surf information journeys (ranging from an individual and/or social-clan topical events scale, to a population-viral and/or humanization-paradigm shifting transformations scale), Command-Control-Communications (C3) logistics, risk evaluation, emergency response, collaborative efforts (for group-ware, project management, team activities, crowd-sourcing, and the like), interactive design, and countless other intelligence-raising man-machine interface experiences.

GLO includes electronic communications enabled software modules bridging (A) from a large set of mutually result-relevant informational links, (B) through a plurality of at least two user-selectable referencing layer representations of respectively interrelated-results, (C) to a graphic display device upon which user significant sections of the referencing layer representations are displayed. In the exemplary context of well known search-and-surf Internet experiences, GLO is a recurring intermediary between iterations of a search and a resultant surf.

The GLO intermediary preferably provides at least two interdependent layers of organized detail for a body of search results; which typically is a large set of mutually result-relevant informational links. The links are of at least two types; such as access to documents, access to presentations (such as films, lectures, graphics, outlines, and/or slides), access to respectively concerned persons, and the like. As was discussed above, a respectively concerned person, in the MNS context, is a person identified from an inverse projecting from the results back onto a population (such as of MNS members, and/or including potential solutions' provider, supplier, experts advisers, and the like) who are known to have looked for and/or accessed these results (or similar). The concerned person may be of a same, similar or different level; and may represent any of diverse wellbeing orientation, criteria, attitude, motivation, or the like. Thus, in that it is important to include and search for potential suppliers of a relevant product and/or a service—wherein they can likewise be a members; thereby likewise forming a spontaneous or special category subset of members who are—suppliers.

Preferably, that is to best appreciate one aspect of how GLO is helpful for understanding results, the results include informational links to a first large subset of documents and/or presentations, and informational links to a second large subset of persons respectively concerned with many of these documents and/or presentations. GLO embodiments redundantly distributes the informational links into at least two user-selectable referencing layer representations of respectively interrelated-results; a lower resolution overview map representation layer and a higher resolution overlay layer.

In the context of this (immediately following) two user selectable referencing layer representations description, "first category" and "second category" relate to respectively different combinations; as will be understood from an example immediately thereafter. Preferably for a three user selectable referencing layer representations example, there would be three respective category combinations, and so forth.

The lower resolution overview map representation layer is organized into a plurality of portions. Each portion is a logical combination of at least two dimensional-type first categories. Onto the plurality of portions are displayed a plurality of map-legend defined symbols positioned according to their respective first category combination attributes. A preponderance of these positioned symbols respectively correspond to clusters of the informational links; which having substantial first category combination similarity therein.

The higher resolution overlay layer that is alternately either (A) a region highlighting (targeting) part of the lower resolution overview map representation, or (B) a graphically organized representation related to informational links that were in the highlighted region. The region highlighting part of the lower resolution overview map representation is user selected, when the user moves the region to an area of the map; such as by joy-stick/mouse/finger (point or touch) navigating a substantially portion-sized frame (such as a rectangle, circle, blob, or the like) over the displayed map representation. The graphically organized representation of the user-selected links (targeted by the frame), which are arranged as a logical combination of at least two dimensional-type second categories. These are preferably displayed with a plurality of map-legend defined symbols, which are proximate to their appropriate link and convolved therewith.

A GLO "first category combination" and "second category combination" example: User ("JJ") wants to buy a used car. Using MNS with a GLO display, JJ restricts his used car needs description to within his low-hi budget limits, and within his geographical area.

To his first query, the lower resolution display indicates car symbols mapped by asking price rows and odometer mileage columns (the "first category combination"); where symbols for cars rated for excellent safety engineering flash blue, symbols for cars with higher than average insurance premiums are underlined in flashing red, and small frames representing similarity to JJ's previously owned cars (when he bought them or when they were at least one year old, and when he sold them) are likewise proportionally positioned on the low resolution display. An oblong frame, to let JJ switch to the next higher resolution display, is automatically sized to include most 15-25 car clusters and automatically positioned to the cluster that has the models with the best owner ratings. JJ can navigate this oblong frame elsewhere over the lower resolution map, or JJ can activate the oblong frame to view the next higher resolution display.

The higher resolution display is organized ("second category combination") to show thumbnail graphics of the respective used car model for sale, with the position of each graphic column sorted into for sale by dealer, first owners, second owner, more than second owner, antique or classic car, and owner history unknown; and the position of each graphic row sorted by best available statistical estimate for ordinary use maintenance costs (parts and labor) for the next 3 years for a used car of the respective condition parameters. Any car on the higher resolution display (A) having a known (by JJ) social networking associate of MNS known relation to a car of this type are under-lined in flashing blue, and (B) having social networking consumer advocates available for consultation are over-lined in flashing red. With only two resolution layers to this example, JJ may either select a thumbnail graphic (to activate the respective informational link and thereby) to see the for-sale notice, select the blue under-line to communicate with his associate, select the red over-line to communicate with the consumer advocate, return to the lower resolution display to move the oblong frame, or return to his query; to modify the query or to modify his "first category combination" and/or his "second category combination" or his symbol assignment functions.

This method of selecting specific area from two dimension lower resolution, into narrow choices can continue many times. A—the selected higher resolution area can become the lower resolution of the next stage; and the 2 dimension of each layer can be also chosen by the user, with default option. In each area, the content can be any combination of text, symbols, animations, photo/s, video, with or without audio, or voice over, or the like. Some of the information can present links, such as emails, URL, telephone numbers, etc. One of the options is that the interface may enable the user to view three dimensional images of an object—e.g., to view the car for all side, to rotate it, to open the virtual car door, and to look at the car dash board. In the future maybe even to try. According to another variation, a simulation or example of the product/solution maybe presented.

One of the exemplary layers can represent a map of an area—e.g. part of a city where the user need is to find a restaurant to have a dinner after a theatre play; so he can choose a first layer to portray an area of up to 10 minutes walk from the theatre, and then the user can ask MNSs to find the best restaurant according to his wellbeing criteria for restaurants (which is already stored on the MNS DB under this member). The MNS knows that this member prefer healthy vegetarian food, he likes Chinese food and Italian food, and prefer quite places, His maximum budget for 2 is £50. The MNS present to the user on the first layer of the map all the restaurants (up to 20—the user elected choice limit) which are opened now, within 10 minutes walk, within the user budget, and mark the map with symbols: vegetarian with V, Chinese with C and Italian with I. Restaurant without vegetarian choice will not be included. The user can ask the MNS now to order the restaurant in another layer according to waiting time from minimum waiting time (up), and long waiting time (down), and cost of these restaurant—cheaper (on the left), expensive (on the right). Now he can view how many restaurants which match his needs, are open now, have with less than 10 minutes waiting time;and choose the range of prices that he prefers; and then go to the higher resolution layers to see more details. He can see now only 3 restaurants answering this criteria, and ask to rank them according to his maximum wellbeing criteria. This include how healthy it will be for him, how much he will enjoy the food, the service, the atmosphere, and the cost. He can go to higher resolution to view the existing menu in this restaurant (as the MNS was searching the menus online while he was looking at his screen). The user selected the one with higher score, and 6 minutes walk, and the MNS sent a real time message to the restaurant and received confirmation for booking a table which will be ready in about 7 minutes. The MNS recommended to the user the best dishes that match his wellbeing criteria. This version of the MNS has also interface with the electronic payment feature on his mobile phone, so for the payment the user brought his iphone next to the wireless payment machine and confirm the payment with his fingerprint. The details of the restaurant, including the dishes that he selected, and the price, automatically were stored on the MNS solutions DB., The MNS asks the user to rank his satisfaction from the meal—and especially to rate the dishes that he liked, and disliked. This information will help to improve the future ranking of the MNS for this user and for others.

Note, hereinafter are four sections which further clarify and exemplify subtle differences between MNS preferred embodiments and ordinary prior art usages of terms of the art; and of ordinary prior art systems enabling items and/or functions associated with those terms. After appreciating these four sections, the respective definitions and exemplary inventive disclosures herein (above) should preferably be better understood.

Now, firstly, in light of all of the aforesaid disclosure of the present invention and of embodiments thereof, for this invention, the term "Wellbeing" (including uses such as "Wellbeing Orientation" and "Wellbeing Criteria") is actually defined by context of use and by some reasonable constraints. As has become clear from the numerous prior art references, "Wellbeing" is first and foremost a term of the art; such as was heretofore mentioned in the contexts of Gallup-Healthways, OECD, various NGOs, and the like. Nevertheless, for the present invention "Wellbeing" relates to mutually compatible states—with regard to a specific issue or aspect; such as between a user and MNS, between the user and a candidate for that users social network, and between a user and a database, etc.

While in general, a broad terminology category of "Wellbeing" in this invention including the respective specific issue or aspect may be something as amorphous as "Happiness", "Flourishing Life", "Satisfaction", "Meaningful life", "unfolding personal potential", or the like, for a specific need, the term should be of mutual interest. For example, two participants (chosen from the list: a user, a database, and another user) may share a common interest in life quality with regard to many life issues and life aspects; however, these same two may no longer be considered compatible with regard to quality of life if, for example, one advocates "longevity at any cost" and the other strongly advocates "early assisted suicide". Similarly, two participants may share a common interest in health for many aspects and issues; while diverging from compatibility with regard to diet, where one is passionately obstinate that diet be restricted to raw vegetarian items while the other considers maximum gastronomic experience to be a nonnegotiable life experience preference.

From these kinds of examples one can see that the ordinary search engine, which attempts to match participant based on some keywords (such as "quality of life" or "health"), may nevertheless match mutually incompatible orientations and criteria. Simply stated, these aspects and issued constitute the "Wellbeing Orientation" and "Wellbeing Criteria" which may more properly match participants. Another way to express this functional intersection is to describe a pair of participants as mutually compliant with respect to a specific need. Thus, the exemplary context is "Wellbeing", while the constraint is a set theoretic intersection representing a harmony of common belief with respect to a specific need. Here it should be noticed that two needs matched participants are associated with respect to a mutual "Wellbeing Orientation" and "Wellbeing Criteria". While this may lead to these participants becoming "friends", the reason that they have been matched is exclusively because they are of mutual "Wellbeing Orientation" and "Wellbeing Criteria" with respect to at least one need. Thus, the matching may be to find a best medical practitioner for a person with a specific combination of medical and logistical issues; or to find a best auto mechanic, or a best school, or the like.

Accordingly, mutual "Wellbeing Orientation" and "Wellbeing Criteria" are used to limit and focus search space results into an appropriate best-practices narrow range of needs matching candidates.

Now, secondly, in light of all of the aforesaid disclosure of the present invention and of embodiments thereof, filtering, security, identity, and trust have slightly different meanings than are currently found in the broad class of all prior art using these terms. Accordingly, it must be noted that one of the important principle of the MNS solution is to create Trust.

Today people can't trust solutions that are offered from the internet, nor can they trust existing processes of accessing the internet. The large information service provider companies, such as Google and Facebook, collect (all the time) information about the users; including what he is searching or looking for, his emails and transactions, his location, etc. This information is used for increasing profit of the supplier; including by selling services and information to potential sellers and/or to governments, by pushing profile targeted advertisements to the users, etc. When a user buys a product or looks at a website, a "cookie" can be installed in his computer; that can continue to provide information to the organization who install it, can be used to push advertisement to the user, and in the worst cases even can be used to access his financial transaction and/or take money from his credit card or bank account.

The MNS preferred embodiments empower the members also in this area of security and trust.

First, MNS preferred embodiments provide each member with a contract in which it will promise to keep the information of the user secure, not to sell it or disclose it to other organisations, and to try to to find the best solutions to each member according to the members preferences and wellbeing criteria; and will not be bias by receiving payment from suppliers or advertisers.

Second, preferred embodiments help the members to protect their information and reducing their risk by providing safer processes and advice.

Third, MNS preferred embodiments collaborate with Cyber security experts to implement the most advanced method to protect its information resources and help the members to protect their information.

In addition the members will be motivated to share information about any security issues, and to help find and report any potential risk to eliminate and prevent any security problems.

One of the preferred embodiments' ways to protect the users' privacy information is by creating a protected security wall or interface between the members information and potential invaders.

This can be protecting the users in both direction—when he sends information and when others want to send him information. For example when the user want to find a solution or to buy a product or service he can ask the MNS to ask for this information or solution or service without disclosing his identity. In some cases the identity must be revealed e.g. when the user want to buy a flight tickets his name must be provide to the airline, in many cases the name can be revealed only to the trusted supplier at the final stage of the process. This may eliminate many other suppliers trying to continue offering solutions to the members or accessing his information. In the same way other sensitive information of the members can be saved and managed in more secured methods with sophisticated encryption; either on the member devices or on the MNS secured platform. Furthermore, the member will not have to type and send these sensitive information element each time (such as date of birth, credit card or bank details, password and access to specific site), instead the MNS will keep these information secured and reveal them only to the relevant organisation according to the members' instructions.

Each member can have a choice if he would like to receive information about specific subject, product or service and from whom he prefer to receive the information and which organisation to block or filter out, how often he would like to receive each type of information and on which device and on what time.

Examples: today a young expecting woman who either search on the internet to find some maternity dress or order such dress, is bombarded with offers and advertisements because the website installed a cookie on her device or Google, who knows this information push advertisements to her devices to buy pregnancy items and few months later to buy baby's products even if she is not interested a or in the worst case even if she had lost her foetus. With the MNS she will be able to search for relevant maternity products via the MNS secure interface without revealing her identity.

Another example: a member would like to replace his car to a better one. The MNS can advice him first to define his wellbeing criteria for buying a car. Preferred exemplary embodiments will present to the members all the relevant attributes for a car, and what weights similar users had preferred. For example: used or new car, age of the car, car manufacture, car class (super-minis, medium, estate, sports, people carriers etc.), car cost, car length, cost of insurance, cost of annual maintenance, depreciation, reliability, breakdowns, safety, acceleration, petrol type and consumption, number of passenger, boot &storage, owner satisfaction, performance, ride comfort, handling, CO2 emission, hybrid, electricity only, number of KM/miles with one charge or one fuel tank, appearance (including shape color, etc), better for Urban driving, highways driving, extra features (audio, video, communication navigation), manual/automatic), easy parking etc. Likewise, if the member is driving only short distance in a city, care about the environment, and can have free charging point at work, he may give high weights for electric car features.

The MNS can present to him the best 10 electric cars which meet his budget, and rank them according to his wellbeing criteria, using the rating of other users and experts for each of the cars' attributes. If the user prefers a second hand car and it is not urgent, he can ask the MNS to find the best 3 cars according to his wellbeing criteria, without revealing his name within the next two weeks. The MNS can create a search for the chosen type/s of cars, can use existing information on the internet, send a query to dealers, and ask specific members (who have informed MNS that they would like to participate in car buying—the selling process) if they know of a good solution that matches the user's requirements. According to the user's preferences the MNS can inform the user during the 2 week period each time a good match is found, or at the end of the 2 weeks, or as often as member prefers, and present him with the best cars found according to the user's preferences, and in the order of the member's wellbeing criteria. For example, as a default— maximum of the sums of the user weights, multiplied by the rates for each car's attributes which was reported by experienced users, which satisfied the user's constrains (within the right price, the right distance from his home, the right age range, etc). All this will be done without revealing the member's details. Only when the user has decided which car to buy and from whom, he can contact this seller and buy the car.

Members' identity confirmation: The MNS will have several alternative processes to confirm the real identity of the members. Members can have a status rates such as new member, email confirmed, mobile telephone confirmed, home address confirmed, passport number confirmed, credit card detailed confirm, bank account confirm. Bio-identity confirm Etc.

The confirmation can be done by sending and receiving a text to the user mobile number, by sending and receiving an email, buy sending a micro payment to the user back account or MNS account with a specific code and get a confirmation with the code from the users etc. In addition the MNS can check his identity on Facebook, and other public sources on the internet, and or receiving confirmations from existing MNS members (whom identity had been confirmed in the past) that they know the new member and confirm his identity. Using this process of identity confirmation will increase the reliability and the trust within the MNS community.

Now, thirdly, in light of all of the aforesaid disclosure of the present invention and of embodiments thereof, a new exemplary understanding of interactive self help may be enabled and appreciated.

As an MNS preferred embodiments' social network purpose it to increase the wellbeing of each one of its member and total wellbeing of all its members, one important component is interactive self help applications. Many exemplary needs of members are to reduce or prevent depression and/or stress and/or anxiety, or to help the member to be happier or healthier. The solutions for such needs can be a combination of external factors—such as to live in a better healthy location, or to have a less stressful job, however many of these needs can be answered by training the respective member to improve some of his behavior and habits, his cognitive process, the ways that he reacts to situations, how he mange his emotions, what he eats, if he is doing exercises and/or physical activities, the way that he made decisions and choices, his character and personal qualities and values, his emotional intelligent, and even his beliefs. These are very important skills that, unfortunately, the education systems today are neglecting to teach. Luckily, many of these skills can be learnt; with help of experts, or in many cases with interactive self help applications that train the users to improve the way that they think, feel, and behave. Examples of such application is "beating the Blues", an interactive self help computerised therapy that had been proven in randomised control clinical trials, to reduce anxiety and depression even better that usual treatment by family doctors in the UK, for moderate anxiety and depression.

This example represent the first generation of interactive self help programs.

An important optional component of the MNS is to incorporate effective and appealing interactive self help applications in the most important aspect of life.

These include preferred embodiment applications which are developed by the MNS or by other applications that the MNS or its members selected and recommend to use for specific needs. As each application will be used by many members, who will report their rating and weighting on its attributes, the MNS will have a list of applications that can be chosen for each user to suit his specific profile and wellbeing orientation and criteria. For example, for some users with mild depression, a short term interactive cognitive behavior therapy self help application can be the most effective way to reduce their depression. For other users, that don't like the cognitive training process, another program which guides them and motivates them (such as to start exercises, join a folk dance group, and find a friend) can be more effective. Therefore the preferred embodiments' MNS will incorporate not only self help applications but also interactive assessments which help the members to define their specific needs and wellbeing criteria, and help them to choose the most effective applications that will maximized their wellbeing. The preferred embodiments' MNS also finds members and therapists that can assist and mentor other members; in addition or instead of the interactive applications—either for a payment or for other MNS currencies.

The preferred embodiments' self help applications cover any or all aspects of life. For example, how to improve your character, how to improve unhealthy habits, how to be successful in an interview, how to create better relationship with your partner, how to help your child to have flourishing life, how to be more happy, how to improve your garden, etc. There are many self help books today. However by combining effective interactive self help applications, with many members' feedback and rating of the applications attributes, and implemented match need algorithms, the preferred embodiments' MNS is able to recommend the best solution to maximize the member's life quality metric according to his wellbeing criteria and orientation.

Essentially, the present invention is herein described with a certain degree of particularity, however those versed in the art will readily appreciate that various modifications and alterations may be carried out without departing from either the spirit or scope, as hereinafter claimed.

For example, it is reasonably anticipated that embodiments of GLO may be applied to all of the aspects and features of the MNS embodiments and variations described herein; that GLO may convolve and respectively display non-sparse combinations of attributes (including features, aspects, synonyms, sub-needs, sub-solutions, etc.) as dimension-type intersecting pairs, in row-column chart type formats, in angle-distance polar coordinate type formats, and the like; and that GLO has generic ICT applications for helping users to navigate through and to understand large data sets, which may be wellbeing-blind.

Likewise, for example, embodiments of the present invention may include a mutual trust agreement between an organization which provides the Needs-Matching Navigator System and a user of the system, and the agreement includes undertakings wherein (I) the provider organization commits: (A) only to disclose confidential or private information of the user to third parties with permission of the user, (B) to enable the user to view and update profile information that the provider manages regarding the user, (C) to be honest and loyal to the user, (D) to try to find a best solution that matches the user's needs according to the user's profile, and (E) to maintain the user's preferences and weighted criteria as free from influence by a provider related supplier or advertiser; and wherein (II) the user commits: (A) to provide true profile information regarding the user's identity, information, and feedback, and (B) to try to find and chose solutions that may improve the user's wellbeing.

Furthermore, in describing the present invention, explanations are presented in light of currently accepted Knowledge-Economy theories and Network-Communications models. Such theories and models are subject to quantitative (computational) & qualitative (cultural) changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments (as MNS, MNS appurtenances, MNS GLO, and generic GLO). Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

Finally, while the invention has been described with respect to specific examples, including presently preferred modes of carrying out the invention, those skilled in the art will appreciate that there are numerous variations and permutations of the above described systems and techniques that fall within the spirit and scope of the invention as set forth in the appended claims. Thus, broadly stated, those skilled in the art will appreciate that systems and methods for the Needs-Matching Navigator System, for social network facilitator appurtenances thereof, and for the Graphical Link Organizer likewise relate to ICT embodiments addressing wellbeing-independent, wellbeing-oblivious, and wellbeing-blind applications; such as are sometimes used in Industrial Design, Computer Aided Manufacture, simulation, animation, 3D-printing, medical triage, diagnostic and analytical expert systems, e-government, call-center information and transaction logistics, and beyond.

The invention claimed is:

1. A Matching Navigator System (MNS), said system including:
a computerized system including a memory storing a user profile, said user profile including:
a user-specific wellbeing criteria database, wherein said wellbeing criteria database includes a plurality of data elements representing predetermined wellbeing attributes, as well as data elements representing user-specific weightings for said predetermined wellbeing attributes,
wherein said MNS monitors data from searches and site visits made using said MNS, compares said data from searches and site visits to said user-specific weighting for said wellbeing attributes, and adjusts said user-specific weighting for said wellbeing attributes based on said data from searches and site visits made using said MNS;
a user-specific wellbeing orientation database, wherein said wellbeing orientation database includes a plurality of data elements representing predetermined wellbeing preference data and user-specific weightings for said predetermined wellbeing preference data,
wherein said user-specific weightings for said predetermined wellbeing preference data are determined using an initial electronic survey presented to a user by said MNS for self-quantification by said user; and
a user-specific understanding level data, wherein said MNS monitors data from searches and site visits made using said MNS, wherein said MNS determines a user-specific understanding level associated with said data from said searches and site visits and records said understanding level as said user-specific understanding level data;
a solution database, stored in memory on a computerized system, wherein said solution database includes a solution data set corresponding to a predetermined potential user search query and a solution-specific electronic survey,
wherein said solution data set includes a plurality of data elements representing predetermined solution attributes,
wherein said data elements represent third-party quantified solution attributes that are quantified based on a plurality of third party user ratings collected from solution-specific electronic survey information received from a plurality of third parties in response to said solution-specific electronic survey,
wherein said data elements representing third-party quantified solution attributes are determined by averaging said plurality of third party user ratings for said predetermined solution attributes;
a computerized user interface, said computerized user interface receiving a search query from said user,
wherein, when said search query from said user is determined by said MNS to correspond to said solution data set, said MNS retrieves said solution-specific electronic survey and transmits said solution-specific electronic survey to said computerized user interface for display to said user,
wherein said computerized user interface receives user-specific weightings from said user for said solution attributes included in said solution-specific electronic survey;
wherein said MNS:
retrieves said plurality of data elements representing predetermined wellbeing attributes, as well as data elements representing user-specific weightings for said predetermined wellbeing attributes from said user-specific wellbeing criteria database;

retrieves said plurality of data elements representing predetermined wellbeing preference data and said user-specific weightings for said predetermined wellbeing preference data from said user-specific wellbeing orientation database; and adjusts said user-specific weightings based on the data elements retrieved to determine user-specific adjusted weighting data for said solution attributes, wherein said MNS:

generates a series of link selections based at least in part on matching said user-specific adjusted weighting data for said solution attributes with said data elements representing third-party quantified solution attributes, and said user-specific understanding level; and a Graphical Link Organizer (GLO) representing a user interface displaying a plurality of user-activatable links to organized search results, wherein said GLO includes:

a first interface display area including links to search results that have been determined to be at the user-specific understanding level of said user based on user-specific understanding level data;

a second interface display area including links to search results that have been determined to be above the user-specific understanding level of said user based on said user-specific understanding level data; and a third interface display area including links to search results that have been determined to be below the user-specific understanding level of said user based on said user-specific understanding level data.

2. The system of claim 1 further including a fourth interface display area intersecting said first interface display area, said second interface display area, and said third interface display area, wherein said fourth interface display area displays links determined using said plurality of data elements representing predetermined wellbeing attributes, as well as data elements representing user-specific weightings for said predetermined wellbeing attributes.

3. The system of claim 1 wherein said MNS further monitors positional data received from a GPS system associated with said user and adjusts said user-specific weighting for said wellbeing attributes based on said positional data.

4. The system of claim 1 wherein said MNS further monitors physiological data received from a physiological data monitoring device associated with said user and adjusts said user-specific weighting for said wellbeing attributes based on said physiological data.

\* \* \* \* \*